United States Patent [19]

Xitco, Jr. et al.

[11] Patent Number: 5,392,735
[45] Date of Patent: Feb. 28, 1995

[54] MARINE MAMMAL COMMUNICATION DEVICE

[75] Inventors: Mark J. Xitco, Jr., Kissimmee; John D. Gory, Orlando, both of Fla.; Kerry M. Perkins, Simi Valley, Calif.; Marshall M. Monroe, Glendale, Calif.; William G. Redmann, Simi Valley, Calif.

[73] Assignee: The Walt Disney Company, Burbank, Calif.

[21] Appl. No.: 968,817

[22] Filed: Oct. 30, 1992

[51] Int. Cl.$^6$ ............................................. A01K 15/02
[52] U.S. Cl. ..................................... 119/712; 119/905
[58] Field of Search ............... 119/174, 201, 702, 712, 119/719, 905; 434/231, 232, 322; 341/23, 27

[56] References Cited

U.S. PATENT DOCUMENTS

| | | |
|---|---|---|
| 3,372,789 | 3/1968 | Thiele et al. |
| 4,245,587 | 1/1981 | Cooper et al. ......................... 119/712 |
| 4,315,482 | 2/1982 | Cooper et al. ......................... 119/712 |
| 4,465,465 | 8/1984 | Nelson ................................... 434/112 |
| 4,713,535 | 12/1987 | Rhoades . |
| 4,774,501 | 9/1988 | Ikeya ..................................... 341/23 |
| 5,260,512 | 11/1993 | Chomette et al. ................. 341/22 X |

FOREIGN PATENT DOCUMENTS 2078424  1/1982  United Kingdom ................. 434/231

OTHER PUBLICATIONS

D. Reiss and B. McCowan, "Spontaneous and Productive Use of Facsimiles of Computer Generated Whistles By the Bottlenosed Dolphin," *Abstracts–8th Biennial Conference on the Biology of Marine Mammals* (1989).
L. M. Herman, "Receptive Competencies of Language Trained Animals," *Adv. Study Behav.*, 17:1–60 (1987).
L. M. Herman, "The Language of Animal Research . . . " *Psychol. Rec.*, 38:349–362 (1988).
L. M. Herman, "In Which Procrustean Bed Does the Seal Lion Sleep Tonight?" *Psychol. Rec.*, 39:19–49 (1989).

M. J. Xitco, "Echolocation Matching For Shape, Material and Internal Structure," a paper presented at the 18th Annual Conference of the International Marine Animals Trainers Association, Chicago, 1990.

(List continued on next page.)

*Primary Examiner*—Robert P. Swiatek
*Attorney, Agent, or Firm*—Haverstock, Medlen & Carroll

[57] ABSTRACT

An innovative communication device and learning tool that enables marine mammals, such as dolphins, to communicate with humans and with each other. The communication device includes a keyboard having a plurality of hollow keys. Each key includes a switch which can be activated by the dolphin, and a two- or three-dimensional object which can be distinguished by dolphins from other objects in other keys both visually and through echolocation. A microprocessor based controller can be used to associate audible feedback, such as unique words or phrases, with each key and to generate that word or phrase when the proper key is selected. Thus, a dolphin can select a word or phrase by locating the associated key and by activating the switch for that key to communicate with humans or with another dolphin. Likewise, a human can activate the switch to generate a spoken word or phrase to communicate with a dolphin. A photosensor switch can be advantageously used as a non-contact switch to enable the dolphin to use its rostrum or other body parts to select a key by breaking an optical beam generated across the opening of the key. Thus the dolphin simply swims towards the object in the key to activate the switch by breaking the beam. In addition to controlling the audible feedback when a key is selected, the controller can be used to record a log of events of the session, including the keys selected and the time at which such selections occurred, as well as observer comments.

54 Claims, 7 Drawing Sheets

OTHER PUBLICATIONS

L. M. Herman, et al., "Generalization of Visual Matching By a Bottlenosed Dolphin: Evidence for Invariance of Cognitive Performance With Visual and Auditory Materials," *J. of Exper. Psychology*, V. 15, No. 2, pp. 124–136 (1989).

R. J. Schusterman and R. C. Gisiner, "Artificial Language Comprehension in Dolphins and Sea Lions: The Essential Cognitive Skills," *Psychol. Rec.*, 38:311–348 (1988).

R. J. Schusterman and R. C. Gisiner, "Please Parse the Sentence: Animal Cognition in the Procrustean Bed of Linguistics," *Psychol. Rec.*, 39:3–18 (1989).

L. M. Herman, et al. "Comprehension of Sentences By Bottlenosed Dolphins," *Cognition* 16:129–219 (1984).

L. M. Herman, "Cognition and Language Competencies of Bottlenosed Dolphins," in *Dolphin Cognition and Behaviour: A Comparative Approach* (R. J. Schusterman et al., eds), pp. 221–251, (Erlbaum, Hillsdale, N.J., 1986).

S. Savage-Rumbaugh et al., "Language Learning in Two Species of Apes," *Neurosci. Biobehav. Rev.*, 9:653–665 (1985).

E. S. Savage-Rumbaugh, "Language Learning in the Bonobo; How and Why They Learn," *Biological and Behavioral Determinants of Language Development*, (N. Krasneger et al. eds) (Erlbaum, N.J., 1991).

E. S. Savage-Rumbaugh, "A New Look At Ape Language: Comprehension of Vocal Speech and Syntax," Nebraska Symposium on Motivation 1987 (*Current Theory and Research in Motivation* (R. A. Dienstbier et al., eds), 35:201–255, (U. Neb. Press 1988).

S. Savage-Rumbaugh et al., "Symbols: Their Communicative Use, Comprehension and Combination By Bonobos," in *Advances in Infancy Research*, (L. P. Lipsitt and C. Rovee-Collier, eds.), pp. 221–278, (Ablex Publishing Co., Norwood, N.J., 1990).

S. Savage-Rumbaugh, "Spontaneous Symbol Acquisition and Communicative Use By Pygmy Chimpanzees," *J. Exp. Psychol.: Gen.*, 115:211–235 (1986).

C. A. Ristau and D. Robbins, "Language In The Great Apes: A Critical Review," in *Advances in the Study of Behavior*, (J. S. Rosenblatt et al., eds.), pp. 141–181, (Academic Press, New York, 1982).

L. Herman and P. Forestell, "Reporting Presence or Absence of Named Objects By A Language Trained Dolphin," *Neuroscience & Behavioral Rev.*, 9:667–681 (1985).

P. Morrel-Samuels et al., "Cerebral Asymmetries for Gesture Recognition in the Dolphin," *Abstracts–8th Biennial Conference on the Biology of Marine Mammals* (1989).

P. Forestell et al., "Reporting By A Language Trained Dolphin on Relationships Between Objects Named In Complex Instructions," *Abstracts–8th Biennial Conference on the Biology of Marine Mammals* (1989).

Herman, L. et al., "Recognition and Imitation of Television Scenes By Bottlenosed Dolphins," *Abstracts–8th Biennial Conference on the Biology of Marine Mammals* (1989).

MARINE MAMMAL COMMUNICATION DEVICE

APPENDIX

An appendix consisting of 25 pages of source code for the computer program used to operate the present invention is attached hereto.

FIELD OF THE INVENTION

The method and apparatus of the present invention relate to the fields of communications, animal training, and animal cognition research; more particularly, the present invention relates to a keyboard used for communications by marine mammals.

BACKGROUND OF THE INVENTION

Attempts have been made for many years to develop ways of communicating between humans and other species. Research has enabled the development of interactive devices for communication between apes and humans. Particular success has been achieved with chimpanzees by Sue Savage-Rumbaugh and her colleagues at the Language Research Center in Atlanta, Georgia. See, e.g., "Language Learning in Two Species of Ape," by Sue Savage-Rumbaugh et al., *Neuroscience and Biobehavioral Reviews*, Vol. 9, pp. 653-665 (1985). The work of Savage-Rumbaugh et al. was designed to study symbol and language acquisition, referential symbol use, and symbolic communication in chimpanzees. Small, two-dimensional lexigram symbols, arranged on a keyboard, are used by chimps and humans to communicate about relevant interactions like finding and sharing food, playing with toys, and even doing household chores. Chimps learn the lexigrams, not by symbolic matching drills using traditional types of reinforcement, but rather by observing humans using the symbols to communicate in a very free-form interaction about daily activities. In a typical session, a chimp and its trainers roam through a forest, and use symbols on a portable keyboard to discuss where they will go next, whom they might visit, and where favorite food items or toys might be hidden. The particular chimp which was the focus of the study by Savage-Rumbaugh et al. appears to understand English at the level of a young child, uses more than a hundred lexigrams in a referential manner, and employs a simple grammar to clarify his communications.

Attempts at interactive communication with other species have not been as successful. This is true even in the case of certain marine mammals, such as dolphins, porpoises and whales, which are well-known as relatively intelligent creatures having a large brain size in comparison with other animals. Furthermore, these animals have heightened sensory abilities, which enable them to navigate underwater by emitting sounds and then detecting the "echoes" of those sounds reflected from objects in or on the water. This ability to "echolocate" objects is similar to the electronic sonar used by submarines and ships to detect the location of nearby objects (e.g., other ships) in or on water. However, dolphins, porpoises and whales can use this ability to discriminate among objects having different shapes, sizes, densities, and textures, including complex two-dimensional and three-dimensional forms. Moreover, it is also known that these creatures can visually distinguish among two and three dimensional objects having different shapes, including those having different intensities of light and levels of brightness, and can auditorily distinguish different sounds. Nevertheless, in spite of their relative intelligence and heightened sensory abilities, communications between marine mammals and humans have been limited by the lack of a common symbolic medium for facilitating communication.

All training of marine mammals such as dolphins must involve some form of communication. In traditional reinforcement training, humans communicate their expectations, and respond appropriately (e.g., by providing a reward), when the dolphin appears to comprehend and performs the desired action. For example, an upsweep of the trainer's arm sends the dolphin off on a spectacular leap, which can then be followed by the offer of a suitable reward, such as a fish or other food. However, this type of communication is generally only one-way, consisting primarily of commands from human to dolphin concerning the performance of a desired activity or task.

Human trainers have noticed that dolphins often appear to attempt to communicate with humans and influence their behavior by using, for example, squawks and jaw claps. However, the information offered by the animals may appear very ambiguous and quite limited in scope.

Attempts to facilitate unidirectional human-to-dolphin communications have included work with artificial gestural and auditory languages conducted at the Kewalo Basin Marine Mammal Lab (KBMML) by Herman et al. during the 1980's. See, e.g., "Receptive Competencies of Language-Trained Animals," by Louis M. Herman, *Advances in the Study of Behavior*, Vol. 17, pp. 1-60 (1987). This work made use of traditional reinforcement training to study dolphins' ability to understand language. At KBMML, humans trained dolphins to comprehend gestural as well as acoustic symbols for objects, actions, and modifiers. The dolphins' performance in this training indicated an understanding of the effect of order on the meaning of a string of symbols.

Although the KBMML work demonstrated that dolphins were capable of more than simple conditional discrimination and sequence learning, it was not conducive to communication of information pertaining to social interactions between individual dolphins, or between humans and dolphins. The symbol strings were given one-way, from humans to dolphins, and functioned as commands to execute arbitrary actions with artificial objects which, outside of this context, generally held little interest for the dolphins.

Therefore, the need exists for an apparatus and method to enable marine mammals to learn symbolic communication skills, particularly those which label social interactions, and to provide a means for facilitating the use of such symbols for communications among marine mammals and between marine mammals and humans.

SUMMARY OF THE INVENTION

The present invention provides an innovative communication device and learning tool for enabling marine mammals to learn and use symbolic communications to communicate with humans and with each other. In the discussion below, the use of the present invention by dolphins is described. It should be understood that other marine mammals, particularly whales and porpoises, may also be able use the same invention with little or no modification.

The present invention provides a computer-controlled keyboard which focuses on the dolphins' ability to distinguish objects visually and by echolocation. Each key is provided with a unique two- or three- dimensional object. Upon selection of a specific key, audible feedback is provided to the dolphin and its trainers in the form of a preselected and programmed spoken human word, and visual feedback in the form of lighting can be provided to show the key which was selected. Every time a specific key is selected, that key can be illuminated and the word associated with the key repeated.

In one embodiment of the present invention, a submersible keyboard is provided with one or more panels, each of which has a plurality of openings. The keys are preferably flush mounted in the openings. Some of the openings in the panel may be closed with covers so that each panel of the keyboard provides a pattern of keys which is unique and visually distinguishable from any other panel.

Each key includes a hollow tubular housing, a unique two- or three- dimensional object mounted within the housing, and a switch which can be activated by the dolphin. The tubular housing has a diameter sufficiently wide to permit a dolphin to comfortably insert its rostrum (nose). Twelve inches has been found useful. The housing is also preferably of a different color which will provide a different brightness level than the panel, to provide a visual contrast for the dolphins. Each object is typically mounted inside the housing sufficiently close to the opening to permit the dolphin to see the object at an angle, but not so close as to interfere with the operation of the switch. The most preferable two- or three- dimensional objects are those which can be easily visually and/or echoically distinguished from other objects by dolphins. The switch is preferably an optical beam generator/detector mounted to cast a beam across the opening of the key housing. The key is "selected" when the beam is broken, for example by a human hand or a dolphin's rostrum, and a detectable signal is produced.

A computer is associated with the keyboard to monitor the keys so as to detect the signal generated when a specific key is selected, to generate audible feedback, and to record data associated with the training. The computer can be programmed so that a unique word is associated with each key. At least initially, the words selected should be those useful for labeling social interactions, desired actions, objects and the like, in order to promote the dolphin's acquisition of symbols and the development of communication between the dolphins and their human trainers. Audible feedback can be provided by speakers mounted under the water and above the water and controlled by the computer. Thus, when the computer detects a signal indicating that a specific key has been selected, the word associated with that key in the computer's program will be broadcast by the speakers.

The computer can also be used to record a log of events, i.e., the sequence of key selections made and the time elapsed, during the session. In addition, an observer can verbally record observations which are then digitized, stored, and correlated with the log in order that the research performed and observations made are accurately recorded observations can also be entered via keyboard.

In yet another embodiment, a keyboard of the present invention also includes a visual feedback circuit, so that when a specific key is selected, that key is immediately illuminated by visible light.

It is an object of the present invention to provide a communication device that promotes communications with symbols among dolphins and between dolphins and humans. It is also an object of the present invention to provide a communication device that enables dolphins to learn and acquire symbolic communication skills. It is a further object of the present invention to provide a submersible communication device for communication between humans and dolphins with visual and audible feedback to enhance learning of protolinguistic skills.

These and other objects of the invention will become apparent from the Detailed Description of The Invention, taken in conjunction with the accompanying drawings, which illustrate, by way of example, the principles of the invention.

BRIEF DESCRIPTION OF THE DRAWINGS

The objects, features and advantages of the present invention will become apparent to one skilled in the art from reading the following detailed description in which.

DETAILED DESCRIPTION OF THE INVENTION

Figure 1:
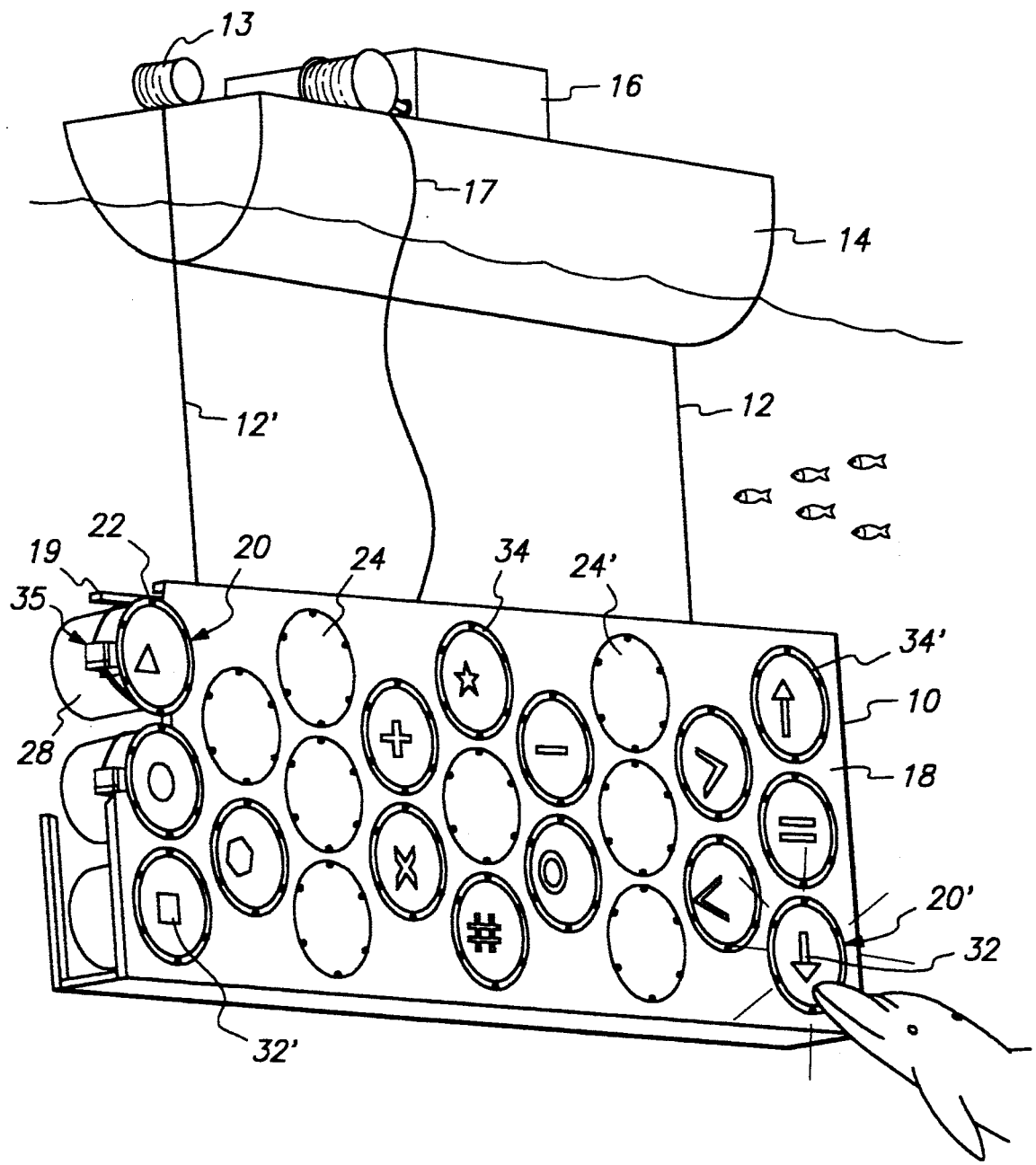
FIG. 1 provides a partially cutaway, perspective view of a communication device of the present invention.

FIG. 1 illustrates a communication device of the present invention. In its simplest form the communication device includes a keyboard 10 and a controller such as a microprocessor or computer 16 (hereinafter referred to simply as "computer") for receiving and storing input from the keyboard and the operator, and for providing preselected audio output when desired. A boat or other form of flotation device 14 is preferably used to support the keyboard 10 below the surface of the water. The depth of the keyboard can be adjusted by adjusting the length of the support cable 12, 12'. An environmentally protected wire harness or cable 17 can be used to couple the computer 16 to the electronics associated with the keyboard 10. Wire harness 17 can be separate, or can be incorporated into the support cable 12. A reel 13 is preferably provided to raise and lower the keyboard. The boat or float 14 securing the keyboard 10 can then be moved about a tank or other body of water to a desired location, providing mobility to the keyboard 10. The keyboard is preferably both mobile and submersible so that it can be moved to the area of the marine environment in which the dolphin and the trainer are interacting.

Figure 3:
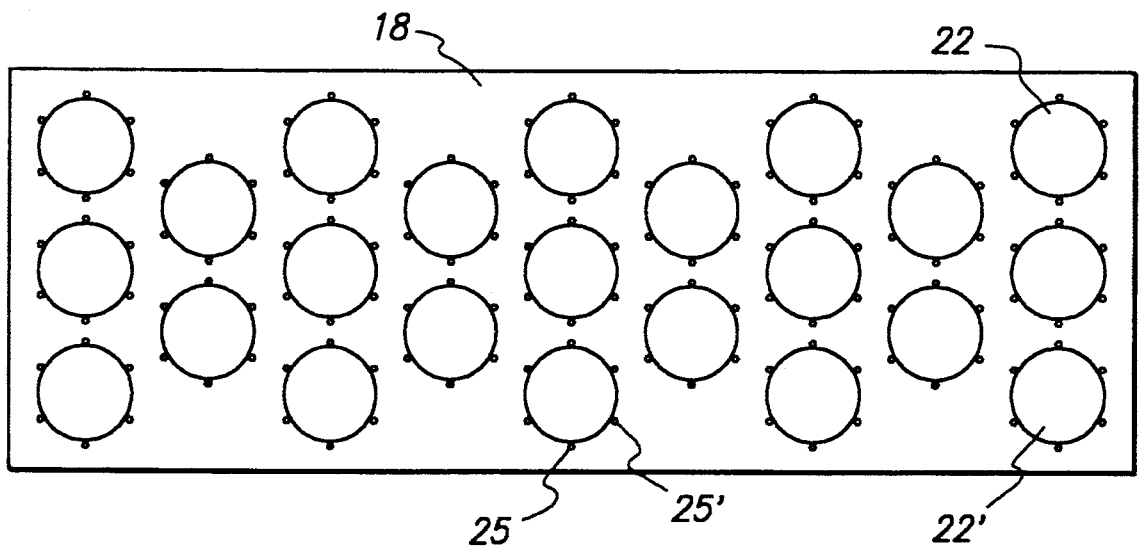
FIG. 3 illustrates a panel for a keyboard of the present invention.

Keyboard 10 is comprised of one or more panels 18 in which a plurality of keys 20, 20' are preferably disposed. Panel 18 can be fabricated from, for example, ¼ inch acrylic sheet material. Panel 18 is preferably mounted to a keyboard frame 19. As shown in more detail in FIG. 3, each panel is provided with a plurality of openings 22, 22'. As shown in FIG. 1 some of the panel openings 22, 22' in keyboard 10 will be selected for mounting keys 20, 20', shown in FIGS. 4a and 4b, while other panel openings 22, 22' will be closed off with covers 24, 24', shown in FIG. 4c. This enables the construction of a keyboard panel 18 having a unique pattern of keys 20, 20'. Such a unique pattern of keys 20, 20' is particularly desirable when a keyboard 10 has more than one keyboard panel 18, since it aids the dolphins in distinguishing one panel from another, and can aid in preventing confusion as to the location of specific key(s) desired for communication by providing distinct patterns which the dolphins can use as "landmarks." Additionally, the covers 24, 24' can be removed from the closed off panel openings, and a key mounted to the opening, if, at a later time, the operator wishes to add additional keys to the keyboard panel. Different configurations and locations of keys can thus be generated for the specific research or other applications to be performed. The spacing between keys can also be determined by the application. In a densely packed keyboard, the spacing between keys may be as small as a few inches or less. If more space is available, the spacing can be increased. Because it is desirable to submerge the keyboard for operation underwater by dolphins or other marine mammals, one skilled in the art will recognize that the panels 18, the keys 20, and the covers 24 should all be constructed from materials which will withstand repeated submersions in various aquatic environments. Plastics and other materials which do not corrode or deteriorate when exposed to salt water are preferred.

Figure 2:
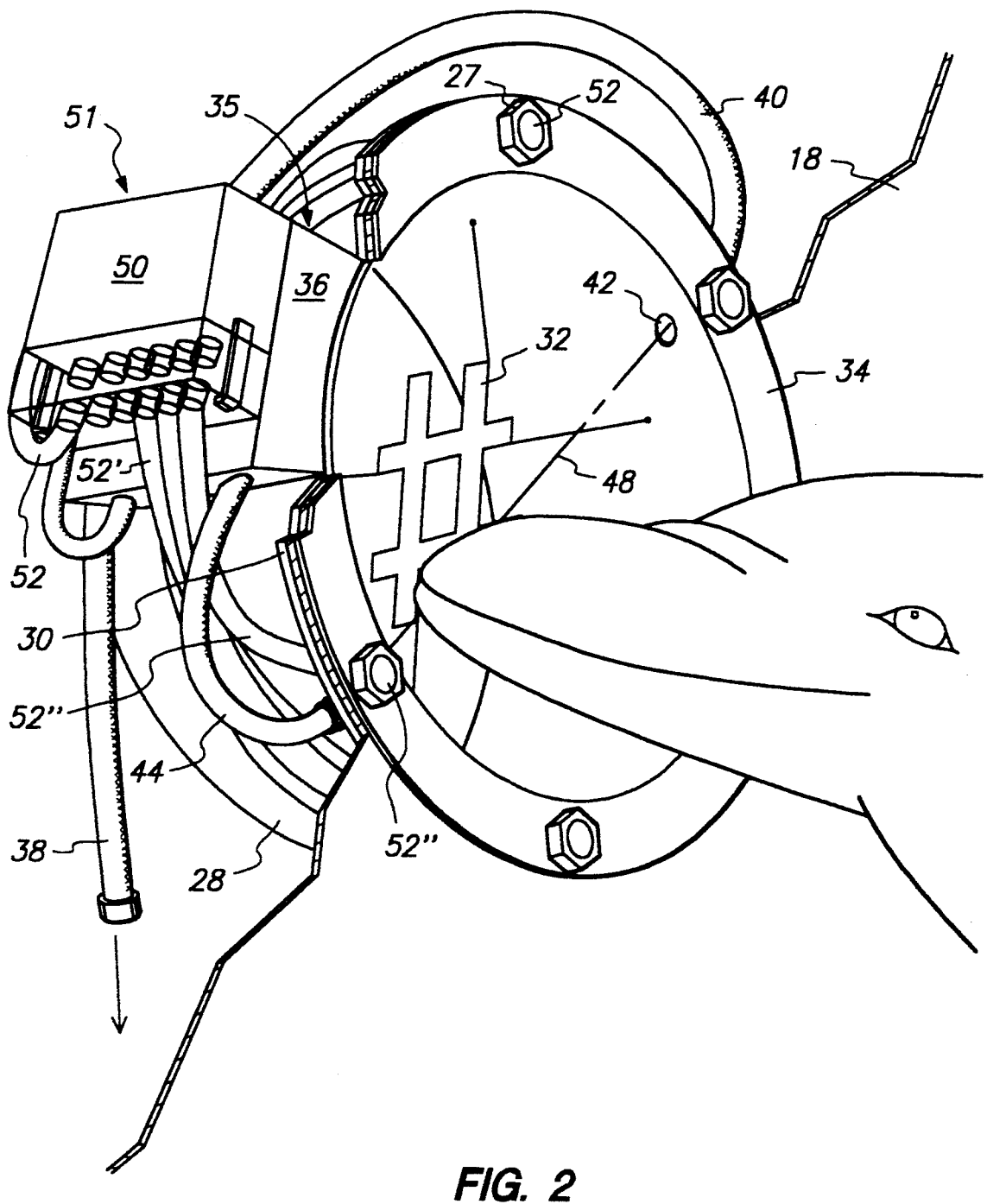
FIG. 2 provides a partially cutaway, perspective view of a key in a keyboard of the present invention.

As shown in FIGS. 1 and 2, each key is preferably formed from a key housing 28 which can be flush mounted to the back surface of the panel 18 behind a panel opening 22. Key housing 28 is preferably formed of PVC duct pipe. When the keyboard is to be used with dolphins, panel openings 22, 22' and key housing 28 preferably have a diameter of about 12 inches or larger. This size allows the use of symbol objects 32 that are large enough to be visually and echoically distinguished by dolphins. Further, a key housing 28 of this diameter also provides sufficient room for the insertion of a dolphin's rostrum into the key housing 28. The key housing should also be sufficiently long to contain the echolocatable/visually distinguishable object, as well as to provide ample room for operation of a switch. Preferably, the length of the key housing is approximately twenty-four inches. While pipe having a circular cross-section is preferred, it would, of course, also be possible to use a housing with another cross-sectional shape. To aid in mounting the housing 28 to the back surface of the panel 18, the housing 28 can be provided with a flange 30 at one end.

The covers 24, 24' will be larger than the panel openings 22, 22' so that the panel openings not used as keys will be completely closed off. The covers 24, 24' are preferably the same color and are preferably formed of the same material as that used for the panel 18.

As shown in FIGS. 3, 4a-4c, and 5, bolt holes 25, 25' can be provided around the circumference of the openings 22, 22' to aid in attaching the key housings 28 and covers 24, 24' to the panel 18. Bolt holes 25", 25''' of similar numbers, size and location can be provided in each flange 30, cover 24, and ring 34 to aid in aligning and fastening those components to the openings 22, 22'. A bolt 27 can then, for example, be inserted into each of the aligned bolt holes 25, 25" and a nut tightened on the end of each bolt 27 to attach a key housing 28 or a cover 24 to a panel opening 22. Nylon bolts and nuts are preferred because they are not adversely affected when submersed in salt water.

A two- or three-dimensional object 32, 32' which can be visually distinguished by dolphins from other objects used in the keyboard, and which can be distinguished from the other objects used in the keyboard by dolphins using echolocation, is preferably mounted in each key housing 28. Each object used in the keyboard is preferably unique from every other object used in the keyboard. By "unique" it is meant that no other object used in the keyboard will have exactly the same appearance or echolocation "image" to a dolphin as the selected "unique" object.

To aid the dolphin in distinguishing the objects 32, 32' in the keys 20, 20', the key housing 28 is preferably unobstructed at both ends. The objects 32, 32' can be provided with different textures to aid a dolphin to distinguish the objects by echolocation. Likewise, the objects can be provided with different levels of brightness and shape to aid in visual identification by dolphins. As explained in more detail below, each object 32, 32' will preferably be associated, via a computer program and speaker, with an audible language element such as a word or phrase. Alternately, the object 32 may represent a complete sentence, a phrase or a thought. Due to its echolocation and visual capabilities, a dolphin can distinguish different objects and through training, utilizing a keyboard of the present invention, a dolphin will be able to distinguish different objects and learn to associate them with different words, actions and responses.

Figure 4A:
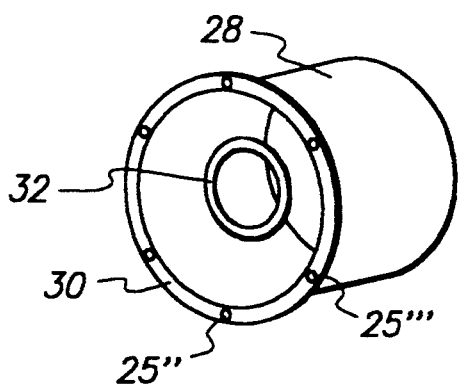
FIGS. 4a, 4b, 4c, and 4d provide perspective views respectively of a first key housing with a first object mounted therein, a second key housing with a second object mounted therein, a cover for an opening, and a decorative ring for mounting on the front of the panel about a key opening.
Figure 4B:
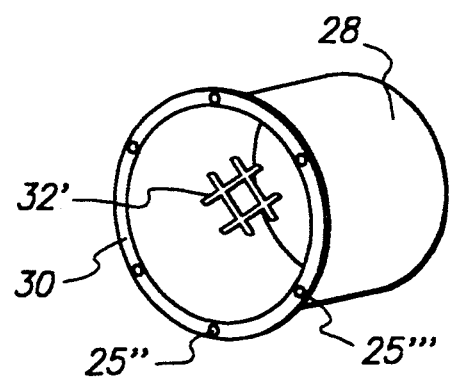
Figure 4C:
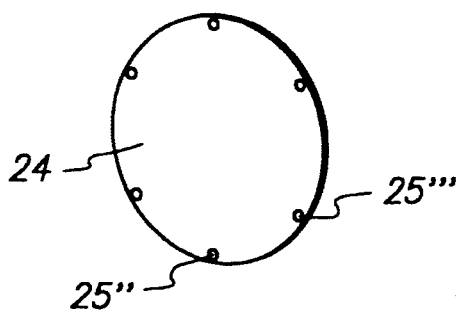
Figure 5:
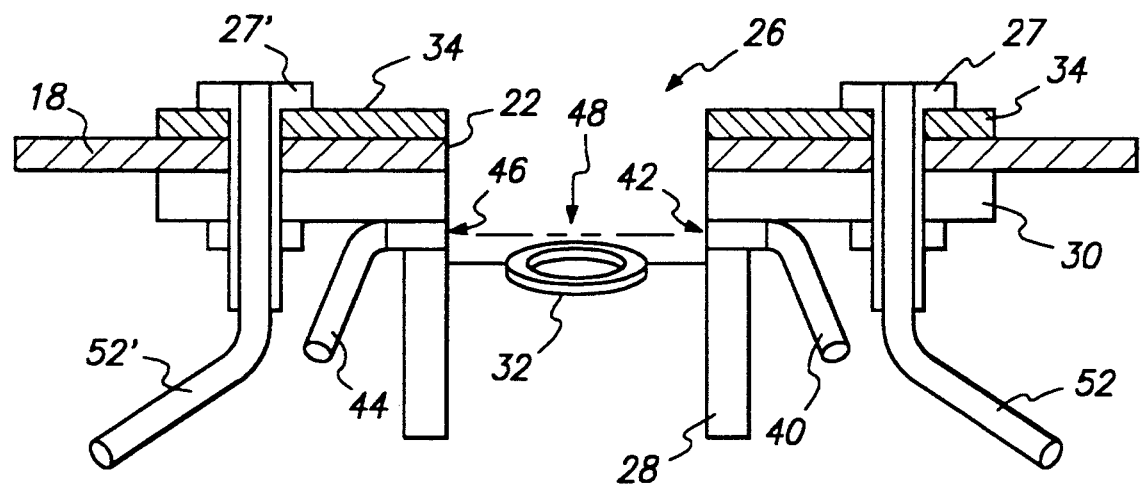
FIG. 5 provides a cross-sectional view of a key mounted in a keyboard panel of the present invention.

An object 32 is preferably placed as close as possible to the front opening of the key housing 28 without obstructing the operation of the switch 35. Locating the object close to the front opening of the key housing 28 allows the dolphin to inspect the key 20 and identify the object 32 from a wider range of angles. This configuration should make finding and selecting keys much easier, especially when the dolphin is swimming in close proximity to the keyboard 10. An illustrative cross-sectional view of the key housing with the switch elements is shown in FIGS. 2 and 5. Illustrative examples of objects 32, 32' are shown in FIGS. 4a and 4b.

Figure 4D:
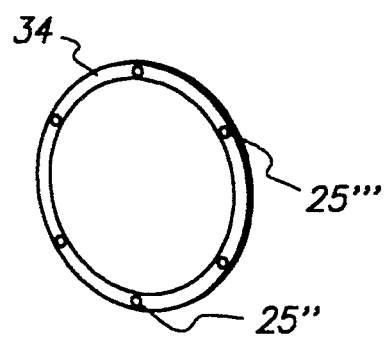

To aid dolphins in visually locating the opening of a key 20, 20', the key housing 28 is preferably a different brightness level from that of the panel 18. For example, the key housing 28 can be grey and the panel 18 yellow. For added contrast, a contrasting decorative ring 34, illustrated in FIG. 4d, can be placed around the openings of the keys 20, 20'. As shown in FIG. 1, the decorative rings 34 can be provided with the same approximate outside diameter as a cover 24 or a flange 30, and the same inside diameter as key housing 28. In the preferred embodiment, ring 34 is distinctively different in brightness from panel 18. The resulting contrast highlights the unique patterns of the keys. Thus, for example, if yellow is selected for the panel 18, and grey for the key housing 28, a black decorative ring 34 could be selected to provide contrast and aid the dolphins in visually detecting a key 20, 20'.

Each key also includes a switch 35 which can be manipulated by a dolphin to indicate selection of a particular key 20. An activatable element of switch 35 is preferably located at or near the opening of each key 20 and is activatable by the dolphin or alternatively the human who is interacting with the dolphin. The switch 35 may be mechanical or electronic, contactable or non-contactable. For example, pressure switches which function when the dolphin pushes or pulls on a structure can form a contactable switch. Thus, a plunger or touch sensitive device can be placed within the housing 28 or adjacent thereto. This plunger device would be sufficiently sensitive that the key may be selected with a slight depression of the device.

However, because dolphins, especially those that are experimentally naive, are known to be reluctant to contact new objects, it is preferred that a non-contactable switch be utilized. Preferably, an optical beam, such as an infrared beam, which is radiated across the opening of the key 20, 20' is detected by a photosensor which can respond to the presence or absence of the beam. While a visible light beam can also be used, an infrared light beam is preferred.

As shown in more detail in FIG. 2, the preferred embodiment of switch 35 is an infrared photosensor unit 36, such as the Banner "Maxi Beam" Model RSBF configured for dark operate, used in conjunction with a Banner "Power-Block" Model RPBT, in conjunction with the optical fibers 40, 44. Photosensor unit 36 can be attached to the outside of the key housing 28. As shown in FIGS. 2 and 5, a fiber optic cable 40 preferably carries the transmitted beam of infrared light from an infrared light generator in the photosensor unit 36 to an opening 42 in the wall of the key housing 28 near the key opening 26. A second fiber optic cable 44 is mounted in an opening 46 in the wall of the key housing 28 opposite of and aligned with the opening 42. The second fiber optic cable 44 receives the infrared beam 48 which is transmitted across the key opening 26, and carries it back to the photosensor unit 36. When the beam 48 is interrupted, for example by the rostrum of a dolphin or a hand of a human, selection of that particular key is indicated and a signal is generated by the photosensor unit 36. As discussed in more detail below, this signal will be detected by the computer.

The signal can also be used, if desired, to turn on a visible light generator 50. As shown in FIG. 2, the light generator 50 includes several fiber optic cables 52 having ends which can be flush mounted in openings around each key 20, 20'. Most preferably, each bolt 27 used to attach the key housing 28 to the panel 18 is drilled completely through along its longitudinal axis, and a fiber optic cable 52 is inserted until the end of the fiber optic cable 52 is flush with the front surface of the bolt 27. The fiber optic cable 52 can be permanently sealed in the bolt 26 by any suitable adhesive or sealer such as, for example, silicon sealant. Thus, when a dolphin breaks the infrared beam 48, and a signal has been generated by the photosensor unit 36, the visible light generator 50 will generate light which will be transmitted to the outside of the key 20 via fiber optics 52, 52' to provide immediate visual feedback. Alternatively, light can be provided through a spot light located interior or exterior to the cell to illuminate each object. As noted above, the lighting is preferably initiated by the signal generated by the photosensor unit. Alternatively, however, the lighting can be controlled by the computer 16 via a digital input/output module 54, shown in FIG. 6. Such visual feedback can provide light about the opening of a selected key 20, change the intensity of illumination to a brighter intensity if the key is normally illuminated, or turn off the light normally illuminating a key to indicate selection of that key 20. Preferably, the key is not normally illuminated, rather, the key is temporarily illuminated when it is selected.

Because the photosensor unit 36, and visible light generator 50, are preferably attached directly to the key 20, they will need to be protected from the corrosive effects of the marine environment. For example, a sealed, watertight housing 51 can be used to contain the photosensor unit 36 and light generator 50. Likewise, any fiber optic or electrical cables which are intended to be partially or entirely submerged with the keyboard should be selected from materials which are substantially impervious to immersion in salt water, or, alternatively, should be sealed to protect them from the effects of salt water immersion. A housing such as that disclosed in U.S. Pat. No. 957,265 filed Oct. 6, 1992 for Apparatus and Method for Underwater Fiber-Optic Coupling, by Marshall M. Monroe, et al. which issued on Apr. 19, 1994 as U.S. Pat. No. 5,305,407 which is incorporated herein by reference, is preferred for housing both the switch 35 and the visible light generator 50 and can be used to advantage to increase the reliability of a communication device of the present invention.

The photosensor unit 36 attached to each key 20 can be connected to a digital input/output module 54 by a four-wire cable 38. The digital input/output module 54 formats the data received from the photosensor unit 36. The formatted data is available to the bus 56 and is then translated into a format which may be read by a computer 16. The computer 16 receives the switch input which indicates whether a key is selected and generates any feedback that is required upon selection of the key. In addition, the computer 16 maintains a log of the events that occur, the time the events occur and information concerning the status of the system. Preferably, the computer 16 is a personal computer.

The computer 16 monitors key selections via data provided by the bus 56 via the digital input/output modules 54. Preferably, the bus is an RS-485 compatible link which is subsequently converted by a converter 58 to an RS-232 or other format compatible with the personal computer 16. The digital input/output module 54 receives the data from the photosensor units 36 and converts it to a data representation which can be processed by the computer 16. For example, the input/output module 54 accepts switch closures, and formats the data for transmission in response to query from the computer 16. An example of a digital input/output module is the M1000 series signal conditioning modules manufactured by Metra Byte Corporation, Taunton, Mass.

Although the system may operate in an interrupt driven manner, it is preferred that the computer 16 poll the digital input/output modules 54 for a selection of a key 20, 20'. When a key 20 is selected in an interrupt driven system, an interrupt signal is generated and input to the computer 16 to notify the computer 16 that a key 20 has been selected. In a polled system, the information regarding key selection is maintained by the digital input/output modules 54 until the computer 16 polls or reads the digital input/output modules 54 for information. Thus, when a dolphin selects a key 20 by breaking the optical beam 48, the photosensor unit 36 creates a signal which is detected by one of the several digital input/output modules 54 attached to an RS-485 serial loop. The computer 16 polls the input/output modules 54 to detect a switch closure. When the switch closure is detected, the event information is recorded by the computer 16 and the appropriate feedback is generated.

Preferably, audible feedback is provided when a key 20 has been selected. Audible feedback may be provided by a sound generator 60 coupled to the computer 16. The sound generator 60 is controlled by the computer 16 and generates predetermined sounds underwater through underwater speaker 63 for detection and recognition by the dolphin. Additionally, the sound generator 60 can also generate the same predetermined sound above water through speaker 62 for recognition by human researchers and trainers who are not in the water at the time the key 20 is selected. An example of a sound generator 60 is the Sound Blaster ®, manufactured by Creative Labs, Inc. The codes corresponding to sounds to be generated for each key are stored on the computer 16. Thus, when a key 20 is selected, a key value or identification is utilized to access codes corresponding to the sounds to be generated as feedback. The codes are input to the sound generator 60 which generates the analog signals to drive the audio output through speakers 62 and 63. If the computer 16 is a personal computer, the sound generator is preferably attached to an expansion port of the personal computer. Thus, the information retained with respect to each key is a digitized version of the sound or word associated with each key 20 which is to be generated upon selection of that key 20. In addition, to provide further flexibility, it is preferred that multiple versions of a spoken word reflecting multiple voices are used so that the dolphin learns the general characteristics of each word independent of a particular speaker, thus helping the dolphins to improve their comprehension of the acoustic feedback.

Figure 6:
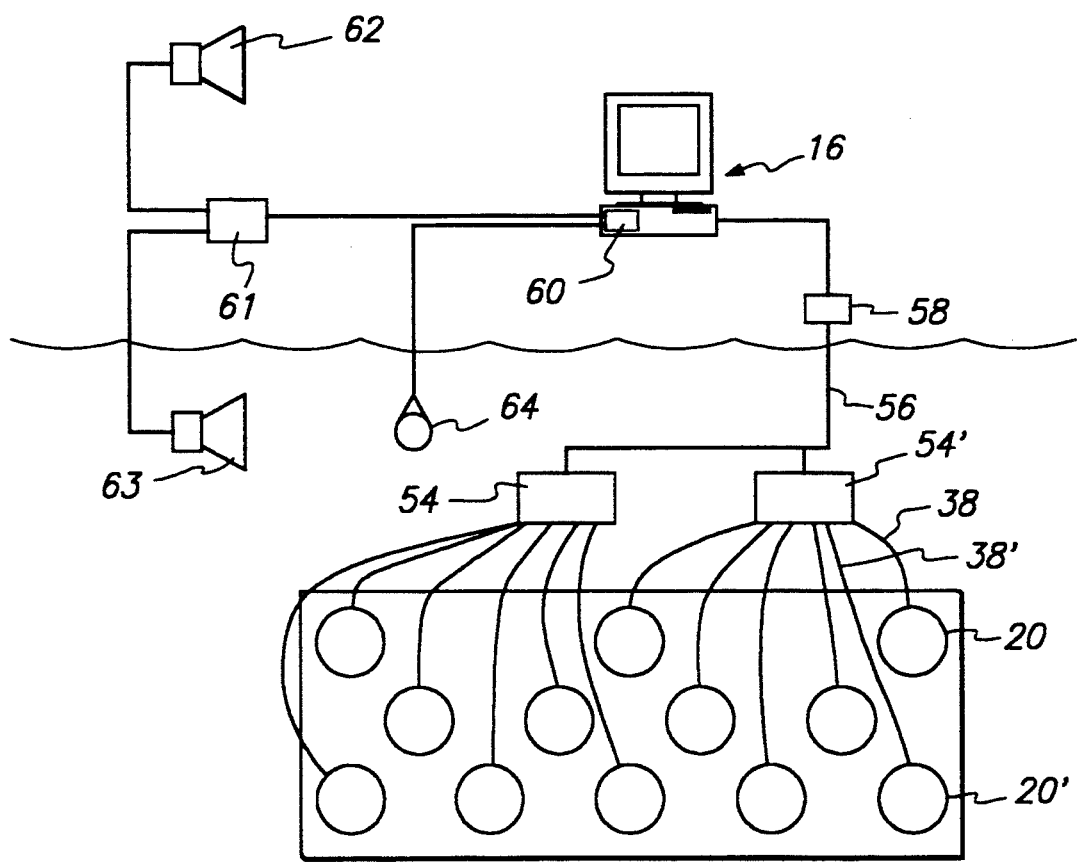
FIG. 6 provides a block diagram illustration of the computer and interface circuitry utilized in a keyboard of the present invention.

As shown in FIG. 6, the audio signals drive two speakers: an underwater speaker 63 and a standard speaker 62 above the surface. An amplifier 61 can be used to boost the audio signals from sound generator 60 to levels sufficient to drive the standard speaker 62 and the underwater speaker 63.

Computer 16 can also be advantageously used to maintain a log of events during a session. When a key 20 is selected, the computer 16 can enter into a database or file the identification of the key selected and the time the key was selected. The computer 16 can also maintain other information such as the feedback provided, e.g., an identification of the sound provided and the voice that generated the sound. In addition, because an observer will likely wish to record observations made during the session with the dolphin, provisions are preferably made to record such observations. These observations are invaluable for research purposes.

A microphone 64, adapted for use by an observer underwater (e.g., by mounting in a diver's face mask) can be provided for the observer to record verbal observations. The observer can open and close observer comments by depressing a hand-held underwater switch. The analog signal received from the microphone and reflective of the verbal observations is input to the sound generator/audio digitizer 60, which receives the analog input signal from the microphone 64 and generates a digital version of the audio signal which can then be stored in a log file or database on computer 16. Preferably, a separate file is maintained for each observation sequence recorded. The file names of the recorded observations are recorded in the event log file for cross reference. When the computer 16 detects a key 20 selection, the observer recording is discontinued, event information is written to the log file, feedback is provided and observer recording can be resumed. Thus, observations are closely interrelated with actual events to provide a better record of the research and sessions performed. Although the recording of verbal observations is preferred, observations may be entered via other input devices such as a computer keyboard, mouse or the like.

Figure 7:
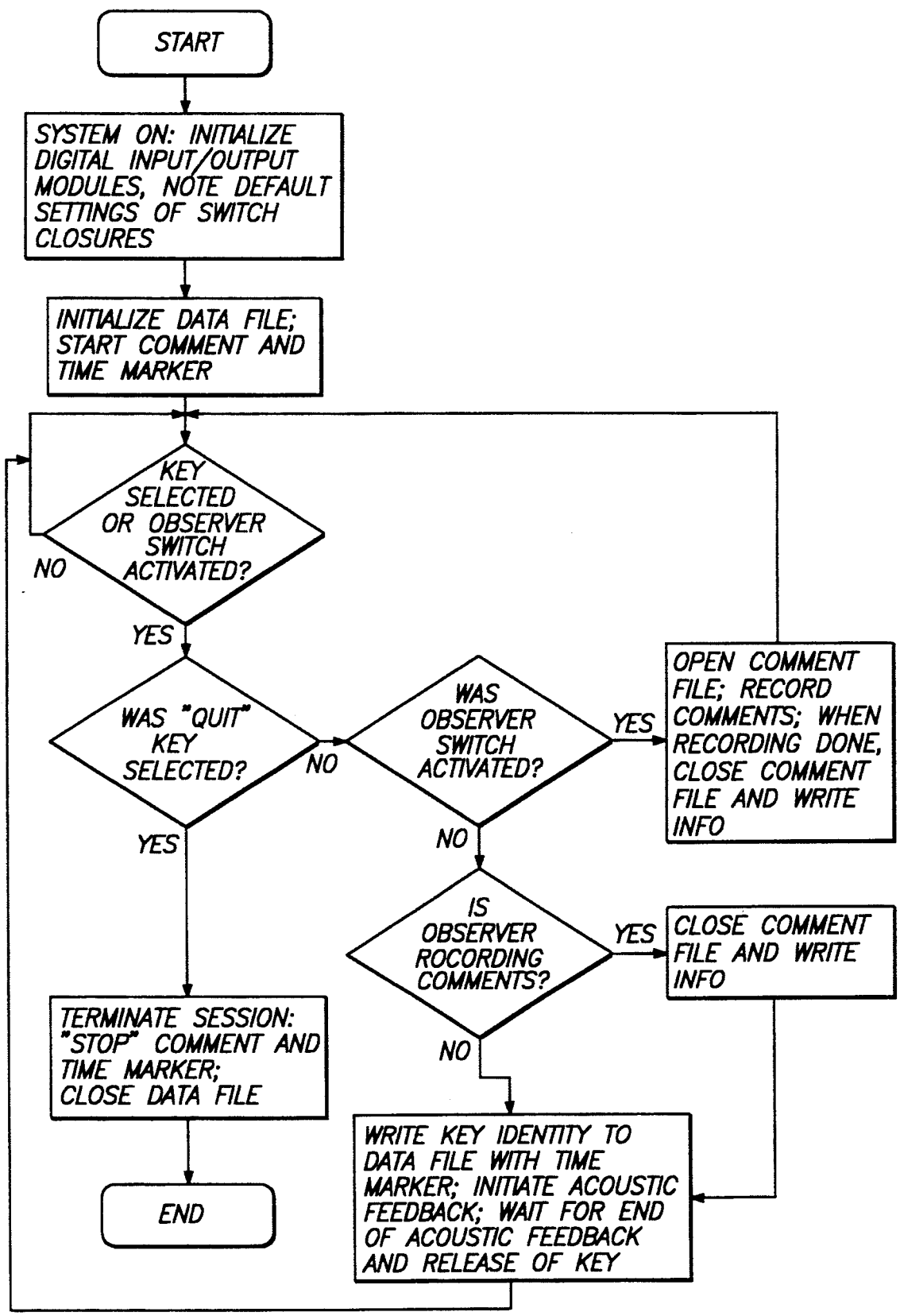
FIGS. 7 and 7a illustrate the function of the controller for a keyboard of the present invention.

The process for detecting and recording selected keys 20 is illustrated by the flowchart of FIG. 7. Once the system is turned on, a data file is opened on the computer 16 to store event information. The comment data generated by the observer may also be stored in the event file. Preferably, the comment information is maintained in separately identified files which are cross referenced by name in the event file. The computer 16 continuously scans the digital input/output modules 54 for a signal that a key 20 has been selected. The observer may input comments which are recorded, along with the time, into a buffer until a key 20 is selected or the observer completes the comments and signals completion of the session by pressing the hand held underwater switch.

If the system recognizes that a key 20 has been selected, the key identity information is written to the event file with a time marker to indicate the time the key was selected. Feedback is provided to the dolphin (for example, illumination of the key and audible feedback) to indicate selection of the key. A lockout for selection of the other symbols is temporarily performed until the feedback is completed and the key is released. Once the feedback has been provided, and the key is released, the symbols are unlocked (and illumination of the symbols is returned to its preselection state).

As noted above, when a decision is made to terminate the session, a preprogrammed key on the computer keyboard, such as <enter>, is selected by the observer. The computer will then stop the comment and time marker and close the data file.

A configuration file is preferably provided to the computer system to configure the system to operate in a predetermined manner. This file is initially accessed at run time to provide operating parameters for the session. For example, the configuration file associates certain symbols with certain words or other language elements and identifies the feedback to be provided upon selection of predetermined symbols. Preferably the observer is prompted for the name of the configuration file to reference at run time. A default file name is included and can be selected, for example, by merely pressing <enter> or the observer may have the option of entering the name of the configuration file. This provides flexibility in operation as different configuration files can be created for different applications, different mammals, or different research studies. Furthermore, the file is designed to be written in ASCII so that it is easily created or edited by a user of the system. Example 1 which follows is an illustrative configuration file structure.

EXAMPLE 1

```
BOF
;This is a comment. Any text followed by a semi-
;colon is ignored
[Key-Word Associations]
;key         word
1            Bob
2            Toby
3            Food
4            Igloo
5            Boat
6            Airjet
;Not all keys have to have a word associated with them
;7           Go
8            Swim
.
.
.
[Voices per key]
;key         num-of-voices
1            5
2            3
3            4
4            5
5            5
6            4
;All referenoss to key "7" have been commented
;out
;7           5
8            3
.
.
.
[Word/Voice Filenames]
;keynum voices  filespec
1         1     C:  WORDS  BOB01.VOC
1         2     C:  WORDS  BOB02.VOC
1         3     C:  WORDS  BOB03.VOC
1         4     C:  WORDS  BOB04.VOC
1         5     C:  WORDS  BOB05.VOC
2         1     C:  WORDS  TOBY01.VOC
2         2     C:  WORDS  TOBY02.VOC
2         3     C:  WORDS  TOBY03.VOC
.
.
.
EOF
```

As can be seen in Example 1, keys 1–8 are identified to have certain words associated with them. For example, key 1 is associated with the word "Bob," key 2 is associated with "Toby", and key 3 is associated with the word "food". In addition, audible feedback associated with a particular key is identified in the configuration file. In Example 1, the feedback is the spoken word associated with the key. Variations are provided by having different voices speak the same word. For example, key 1, associated with the word "Bob," has five different voices that may be used to generate the audible feedback in response to selection of key 1. Key 2, on the other hand, is configured to have three different voices speak the word "Toby" when audible feedback is to be provided in response to selection of the "Toby" key.

The configuration file further identifies the file containing the voice data that is output to the sound generator. Preferably one file is provided for each word and each voice that generates the audio feedback for a word. Thus, for example, the five different voices are provided for the first key word, "Bob." Therefore, five separate files of audio data are provided, each file generating the word "Bob" when output through the sound generator. Similarly, the second key, "Toby" has three different files corresponding to the different voices that can be used to generate the audio feedback of the word "Toby". It is preferable to vary the voices utilized to provide the audio feedback so that the dolphin learns the general characteristics of each word independent of a particular speaker. Thus, for example, the control program can include a random number generator to generate a random selection of the voice to be used to provide the audio feedback. The output of this random number generator would then cause selection of the appropriate file to be output to the sound generator to generate the audio feedback using the selected voice. Alternatively, the control program could allow the selection of a particular voice for all words uttered in a particular training session. This selection could be made at program start-up.

To allow information for one or more sessions to exist on a disk at a time and to allow the user to easily identify a particular session's data, it is preferable that the program permit the user to specify the following at startup: a five letter designator for the session, the location in which to store the session's comments files, the name and location of the session event file and a short description of the session. At the end of the session an events file and session comments file are provided. Preferably the event file is an ASCII file that can be easily imported into other applications such as word-processing, spreadsheet and database programs.

Example 2 which follows provides an illustrative file structure for the event file.

EXAMPLE 2

```
BOF
"TEST A (TSTA): Introduction of Toby to keyboard
"Event No.","Date","Time","Word","Voice","Comment File"
1,"08/31/91","13:47:01","*SESSION STARTED*",0,"TSTA0000.VOC"
2,"08/31/91","12:59:23","TOBY",1,"TSTA0001.VOC"
3,"08/31/91","13:00:05","FOOD",3,"TSTA0002.VOC"
4,"08/31/91","13:00:39","IGLOO",2,"TSTA0003.VOC"
5,"08/31/91","13:00,45","AIRJET",1,"TSTA0004.VOC"
6,"08/31/91","13:00:59","AIRJET",1,"TSTA0005.VOC"
7,"08/31/91","13:01:15","AIRJET",3,"TSTA0006.VOC"
8,"08/31/91","13:01:31","BOB",3,"TSTA0007.VOC"
.
.
.
57,"08/31/91","13:47:01","*SESSION PAUSED*",0,"TSTA0056.VOC"
58,"08/31/91","13:49:13","*SESSION RESTARTED*",0,"TSTA0057.VOC"
.
.
.
211,"08/31/91","14:23:11","*SESSION ENDED*",0,"TSTA0211.VOC"
```

-continued

EOF

The first line in the illustrative event file shown in Example 2 is a session description input by the user. The second line contains the column heading separated by commas to identify the information in the file. The column headings are "event number", "date", "time", "word", "voice" and "comment file". The actual event information starts on line 3 of the event file. Each event record contains the following fields separated by commas: the event number (which is a sequential number indicating the number of events which have occurred), the date of the event, the time of the event, the language element or word selected, the number of the voice used to provide the audible feedback and the name of the comment file corresponding to the event. Alternately, the event can be a comment or observation, wherein the comment is enclosed in double quotation marks in the column "voice" and a zero is entered into the "word" column. In addition, operator intervention is considered an event and is to be recorded like any other event operator events include the start of a session, a pause in the session, a restart of a session after a pause, and the end of a session.

The comments made by an operator prior to or during the occurrence of an event are stored in individual comment files. The name of each comment file is generated by concatenating the five letter session designation, the event number and a predetermined extension. The comment files are saved in a location specified by the operator. Alternately, the comments may be placed in a single comment file or integrated into the event file to provide one large continuous file of comments and event information.

The program preferably monitors the amount of storage space available for the session's files before a new file is opened, as well as after a record of an event has been appended to an event file. If insufficient storage space is available, a warning is given. This monitoring should occur whenever additional space is needed or consumed such that warnings are issued whenever disk space is at a minimum and the program may not be able to continue with the recording of information of the session.

After a session is complete, information regarding the session can be examined by reviewing the file in its saved state or by transferring the event file and comment file to a database spreadsheet or other type of program for review. The replay function of the system is preferably configured to replay observer comments through the sound generator 60. The replay function is invaluable for research purposes because a log of each event that has occurred during a session can be reviewed, and associated comments generated by an observer regarding the session at the time certain events were occurring can be regenerated through the sound generator. An exemplary flow chart illustrating the replay function is set forth as FIG. 7a.

Figure 7A:
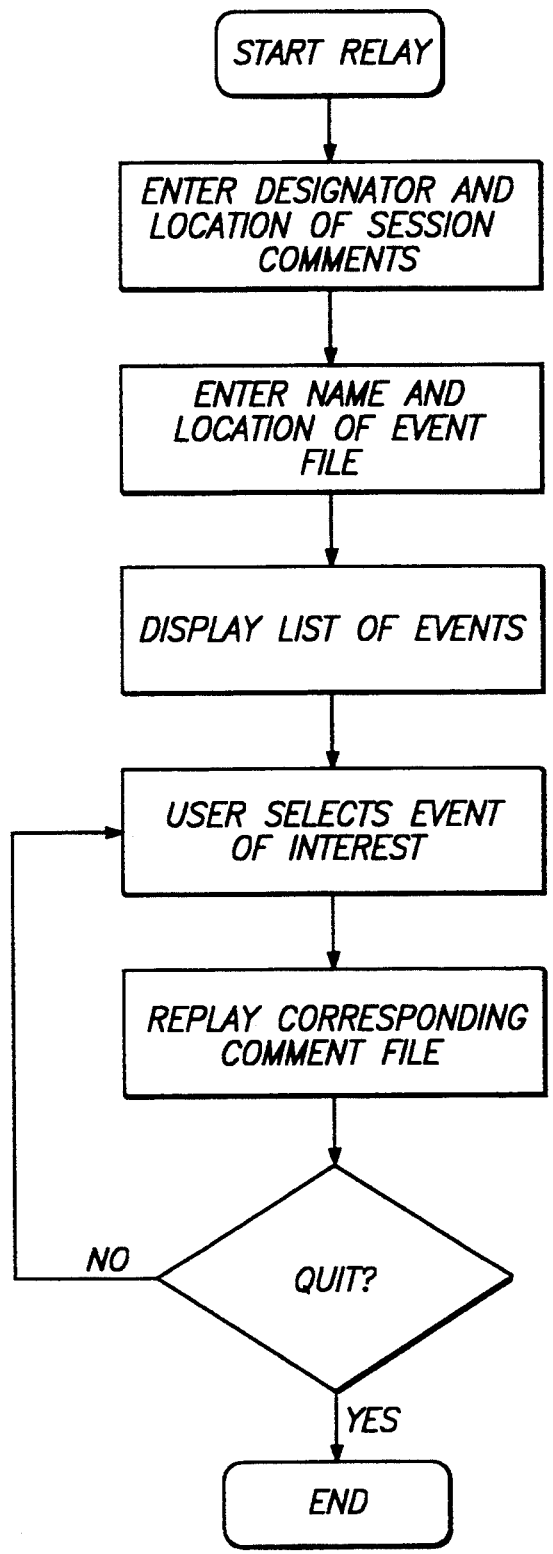
Figure 8A:
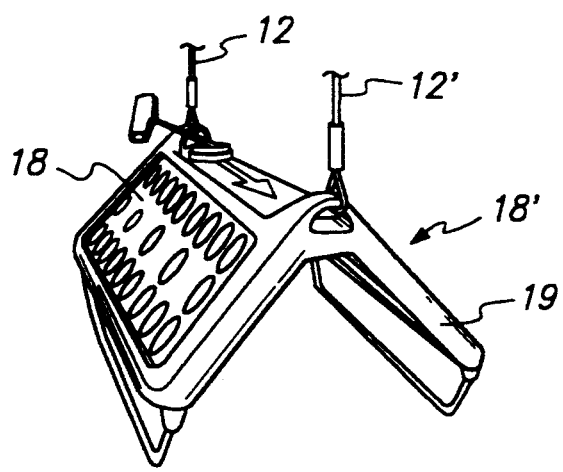
FIGS. 8a, 8b, and 8c illustrate various embodiments of a submersible keyboard of the present invention suspended from a flotation device on the surface of the water; and, FIGS. 9a and 9b illustrate various embodiments of a self-propelled submersible keyboard of the present invention.
Figure 8B:
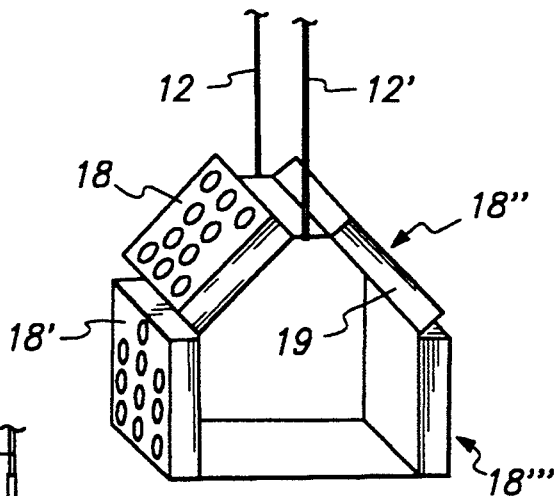
Figure 8C:
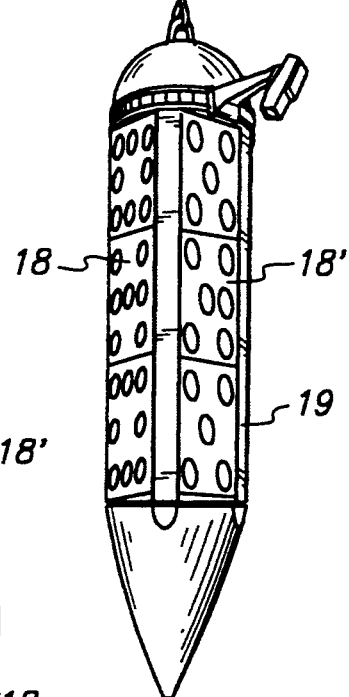

Referring to FIG. 7a, the user initiates the replay program and enters the designator and location of the files containing the session comments. The name and location of the event file is identified by the user. The system responds by displaying a list of the events in the session file. The user may scroll among the events and highlight an event of interest. Upon highlighting an event the corresponding comment file is accessed and output to the sound generator which generates the audio corresponding to the comments. Thus, the user can hear the comments made at the time of an associated event. Different options may be provided depending upon the implementation, however. For example, the operator can restart the replay of the corresponding comment file. Alternately, other options such as pause, abort, and skip may be implemented. Thereafter, another event can be selected or the replay of the session can be terminated. The operator is able to go back and highlight another event of interest and again listen to the corresponding comment file.

The computer programs which have been used by us to perform the functions described in detail above have been filed with this application as an appendix. This appendix includes 25 pages of computer program listings.

Figure 9A:
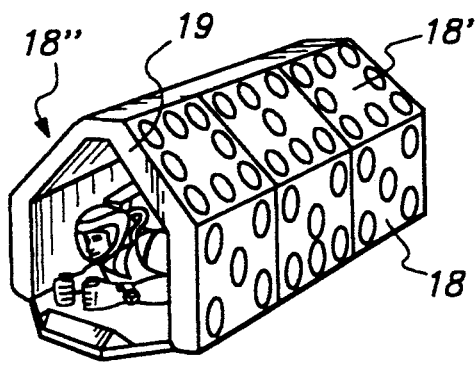
Figure 9B:
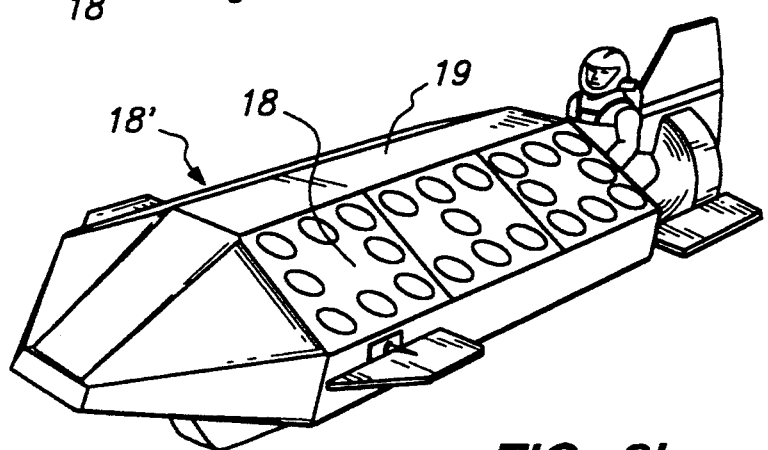

For ease of explanation, the above discussion has been limited to a keyboard 10 having a single panel 18. As shown in FIGS. 8a–8c and 9a–9b, it is envisioned that the keyboard 10 can be formed of two or more panels 18, 18' arranged in a variety of ways. In addition, the keyboard may be moved in the marine environment of the dolphin in a number of ways. For example, three-dimensional keyboards in which multiple panels are connected together, which can be suspended from a boat or float, such as those shown in FIG. 8a, 8b, and 8c could be constructed and used. Almost any shape could be formed from such multiple panel configurations, including square and hexagonal shapes, by providing a frame on which the individual panels can be mounted. As shown in FIGS. 9a and 9b, it is envisioned that the need for a boat or float could be eliminated, and the keyboard mounted in a self-propelled unit. In such a unit, the computer could be contained in an environmentally sealed container mounted on the keyboard, providing unlimited movement in the marine environment while maintaining close contact between the keyboard and the dolphin.

To use a keyboard of the present invention to help dolphins learn and appropriately use symbolic objects for communication, one places the keyboard in an aquatic environment at a desired location where dolphins and their trainers can interact. The computer 16 is turned on and placed in condition to begin its controlling and recording functions. A trainer may begin the training process by, for example, selecting the key(s) which communicate a specific action. For example, the trainer may start very simply by identifying objects in the environment, by presenting them to the dolphin as the key is selected. For example, a ball could be presented to the dolphin, followed by selection of the "Ball" key. As each key is selected, the key is illuminated to show the dolphin the location of the selected key in the keyboard, and the word is played through the speakers both above and below the water to help the dolphin to associate the key with its unique object, and the sound associated with the key. As training progresses, action word keys may be added, and a grammar and syntax developed. For example, a trainer might select the keys "Bob," "give," "Toby" and "fish," in that order, followed by the trainer ("Bob") taking the action of giving the dolphin ("Toby") a fish, or, the trainer may give a command to the dolphin to take an action by selecting the appropriate keys (e.g., "Toby" "go" "boat"). Once the dolphin learns the locations of the various keys, and acquires the meaning of each key, the dolphin is then able to communicate with its trainer by selecting the keys for communicating the desired information.

Once the symbolic language has been acquired by the dolphins, the audible and visual feedback to the dolphin may no longer be necessary. A dolphin trained in the language could use a keyboard of the present invention to communicate with humans or other dolphins trained in the language simply by selecting a key by inserting its rostrum into the opening of the desired key(s). A human, by visually observing the keys selected by the dolphin, or by hearing the associated words through the computer with either headphones or a standard speaker, could respond to the dolphin by, for example, speaking at an above-water location into a microphone connected to an amplifier which drives an underwater speaker, or by illuminating in order, via a keyboard, the keys which provide a message to the dolphin, or, if underwater, by selecting the keys which provide the response. The "conversation" could, of course, be recorded by the computer.

The invention has been described in terms of the preferred embodiment. One skilled in the art will recognize that it would be possible to construct the elements of the present invention from a variety of materials and to modify the placement of the components in a variety of ways. While the preferred embodiments have been described in detail and shown in the accompanying drawings, it will be evident that various further modifications are possible without departing from the scope of the invention as set forth in the following claims.

APPENDIX

```
/* Dolphin Keyboard Driver and Verbal Annotation System */
/* uses a "Sound Blaster" card to name keys when pressed */
/* uses same card to record verbal notes during session */

/* Revision History */
/* v00.00     wgr     06/04/91           initial creation date, testing Sound Blaster */
/* v00.01 wgr 06/09/91   testing of dual record with embedded playback */
/* v00.02 wgr 06/10/91   serial communication routines */
/* v00.03 wgr 06/15/91   general test and debug */
/* v00.04 wgr 06/23/91   debugging serial communication, now large model */
/* v00.05 wgr 08/03/91   debugging data and sound file access */
/* v00.06 wgr 08/05/91   attempting to isoloate file writing problem */

/* NOTE: due to memory allocation methods, cannot run under Borland IDE */ include     "SBC.H"                     /* Sound Blaster sbc_xxx() functions */
include     "SBCVOICE.H"                /* Sound Blaster ctvd_xxx() functions */
#include     "SBCTS.H"
#include     <DOS.H>                     /* standard functions: delay(), sound(), nosound() */
#include     <IO.H>                      /* standard functions: open(), close() */
#include     <STDIO.H>                   /* standard functions: printf() */
#include     <STDLIB.H>                  /* standard functions: exit() */
#include     <CONIO.H>                   /* standard functions: clrscr(), kbhit(), getch() */
#include     <FCNTL.H>                   /* standard constants: for file I/O */
#include     <SYS\STAT.H>                /* standard constants: for file access */
#include     <TIME.H>                    /* standard functions: time, localtime, asctime()*/
#include     <BIOS.H>                    /* standard functions: bioscom() */
#include     <alloc.h>                   /* corefree for debugging */
/* The following includes were added 12/13/91 mja */
#include     <dir.h>                     /* needed for _dos_findfirst */
#include     <ctype.h>                   /* needed for isalnum() */
#include     <string.h>                  /* needed for strcpy(), strcat() */

/****************************************************************
 *
 *            definitions and declarations
 *
 ****************************************************************/
#define      FALSE               0
define      TRUE                1 define      NONE                FALSE        /* assurance that no buttons are pressed */
define      ANY                 TRUE         /* mode looking for buttons pressed */ define      SAMPLERATE          6000 define      NUMBLOCKS           13           /* number of serial devices */
define      CHANNELSPERBLOCK    7            /* number of buttons per serial device */ define      COM1                0
define      COM1_DATA           0x03F8
#define      SETUP_COM           0
#define      SEND_BYTE           1
#define      GET_BYTE            2
#define      GET_STATUS          3
#define      SETTINGS            (0x03 | 0x00 | 0x00 | 0xE0)
#define      XMIT_REG_EMPTY      0x4000
#define      DATA_READY          0x0100
#define      SIZE                9            /* Buffer size for input strings */
```

```c
#define      MAX_VOX         6            /* Maximum number of voices available */
#define      MIN_VOX         1            /* Minimum number of voices available */
#define      FSIZE           33
#define      DIR_SPEC        "C:\\DOLPHIN\\OBSERVER\\"
#define      TIMEOUT_TIME    10
#define      RUN             TRUE
define      QUIT            FALSE struct config_file
{
   char word[28];
   char vox_file[64];
} cfg_file[128];

struct ffblk find_file;
struct config_file far *cfg_file_ptr=cfg_file;
struct tm *tblock;      /* test */
char prefix[SIZE];
char obs_file[FSIZE];
char *vox_num;
char session_id[81];
char max_voices;
char min_voices;
char *ptr;
char *gets();
char observerfile[FSIZE];                /* ???? to be filled with count */
char *obs = &observerfile[20];
char key = RUN;                          /* used to test for exit command */
char keypress[20];
char filename[FSIZE];                    /* sound file to be announced */
char *dest;                              /* used in constructing the filename */
char *source;
char *version;

int yy;                                                                          /* line to use
for data updates */
int input_error;
int numchar;
int notalnum;
int toomany;
int num_vox;
int locate;
int event_no = 0;
int voice_file;                                                                  /* file ID for keyboard
sounds */
int commerr_file;
int observer_file;                       /* file ID for voice log file(s) */
int observerfilecount;                   /* chapter of current observer file */
int ch,ch1, ch2, ch3, ch4;               /* returned DIO values from blocks */ enum action_type {START, KEY_HIT, STOP, PAUSE, RESUME, OBSERVER} a;
const char act[][14] = {"START","KEY HIT","STOP","PAUSE","RESUME","OBSERVER"};

unsigned char send_string_in_use;        /* flag set by comm.asm until xmit done */
unsigned portID;                         /* last port with pressed buttons */

FILE *cfg_in;
FILE *ref_file;                                                                  /* file ID for reference
*/
FILE *obs_event;

const char sndextension[] = ".VOC";      /* sound file extension */
const char ref_suffix[] = "REF.TXT";     /* dolphin event file suffix */
const char obs_suffix[] = "OBS.TXT";     /* observer recording event file suffix */
const char reffile[13];                  /* dolphin event file suffix */
const char obsevent[13];                 /* observer recording event file suffix */ struct date today;                       /* structure to hold date */
struct time now;                                                                 /* structure to hold time
*/

/**********************************************************************
*
*              void error (char *)
*
**********************************************************************/ void error(char *msg)                    /* beep and print error message */
{
   sound(440);
   printf("\n*** Error: %s. ***\n",msg);
   delay(1);
   nosound();
};

/**********************************************************************
*
```

```
*                void driverError (int)
*
****************************************************************/
void driverError(int err)              /* Sound Blaster error messages */
{
   switch (err)
   {
      case 1:   error("CTVD_DRV_ERROR: memory allocation error, see next");
                break;
      case 2:   error("CTVD_DRV_ERROR: another voice process is active");
                break;
      case 3:   error("CTVD_DRV_ERROR: read voice file error, see next");
                break;
      case 4:   error("CTVD_DRV_ERROR: write voice file error, see next");
                break;
      case 5:   error("CTVD_DRV_ERROR: lseek error on voice file, see next");
                break;
      case 6:   error("CTVD_DRV_ERROR: disk full");
                break;
   };
};

/****************************************************************
*
*                int pollBlock(char * cmd)
*                        returns DIO in lower 8 bits, or -1 on failure
*
****************************************************************/ int pollBlock(int p)                    /* query block for DIO */
{
   char *outmsg = "$1DI\r";             /* MetraByte "get status" message */
   char *inmsg = "USE THIS SPACE AS MSG RECEIVER BUFFER";
   int i,j;
   int tmp;
   int time_out = FALSE;
   int data_not_ready = TRUE;
   int xmit_not_ready = TRUE;
   int retry = 0;
   long int previous_time;
   long int current_time;
   long int status;
   time_t timer;

atexit(ctvd_terminate);
   outmsg[1] = '@' + (char) p;          /* set address byte to desired module address */ for (i = 0; i < 5; i++)              /* send "get status" command */
   {
      xmit_not_ready = TRUE;            /* set XMIT_NOT_READY flag */
      if(time_out) i--;                 /* if timeout, send same byte again */
      timer = time(NULL);               /* get time */
      previous_time = timer;            /* store time for timeout check */
      while(xmit_not_ready)             /* while not ready to transmit */
      {
         timer = time(NULL);            /* get time */
         current_time = timer;          /* store current time */
         if((current_time - previous_time) >= TIMEOUT_TIME) /* if time difference greater than 10 */
         {
            printf("\nPollblock() Transmit communications timeout with MetraByte module %d.\n",p);
            com_error();                /* comm timeout - call com_error() */
         }
         if(bioscom(GET_STATUS, 0, COM1) & XMIT_REG_EMPTY) /* if xmit shift reg. is empty */
         {
            xmit_not_ready = FALSE;     /* XMIT_NOT_READY is false */
            status = bioscom(SEND_BYTE, outmsg[i], COM1); /* send byte and store return status */
            if(!(status & 0x8000))      /* if no comm timeout */
            {
               time_out = FALSE;        /* timeout is false */
               retry = 0;               /* reset retry count */
            }
            else                        /* else, if timeout */
            {
               time_out = TRUE;         /* timeout is true */
               if (retry < 3) retry++;  /* if retry count less than 3, increment count */
               else                     /* else, retry count greater than 3 */
               {
                  printf("\nPollblock() Failure to transmit to MetraByte Module %d.\n",p);
                  com_error();          /* comm timeout, call com_error() */
               }
            }
         }
```

```c
      }
   };
   i = 0;
   retry = 0;                                     /* reset retry count */
   time_out = FALSE;                              /* timeout is false */
   do
   {
      data_not_ready = TRUE;                      /* DATA_NOT_READY is true */
      if(time_out == TRUE) i--;                   /* if timeout, send same byte again */
      timer = time(NULL);                         /* get time */
      previous_time = timer;                      /* store time for timeout check */
      while(data_not_ready)                       /* while no data received */
      {
         status = bioscom(GET_STATUS, 0, COM1);   /* get port status */
         timer = time(NULL);                      /* get time */
         current_time = timer;                    /* stare current time */
         if((current_time - previous_time) >= TIMEOUT_TIME) /* if time difference is greater than 10 */
         {
            printf("\nPollblock() Receiver communications timeout with MetraByte module %d.\n",p);
            com_error();                          /* comm timeout, call com_error() */
         }
         if(status & DATA_READY)                  /* if data received */
         {
            data_not_ready = FALSE;               /* DATA_NOT_READY is false */
            if(!(status & 0x8000))                /* if no comm timeout */
            {
               time_out = FALSE;                  /* timeout is false */
               retry = 0;                         /* reset retry count */
               inmsg[i] = inportb(COM1_DATA);     /* get a byte of data from COM1 */
            }
            else                                  /* else timeout */
            {
               time_out = TRUE;                   /* timeout is true */
               if (retry < 3) retry++;            /* if retry count less than 3, increment retry count */
               else                               /* else retry count greater than 3 */
               {
                  printf("\nPollblock() Failure to receive from MetraByte Module %d.\n",p);
                  com_error();                    /* comm timeout, call com_error() */
               }
            }
         }
      }
   }
   while (inmsg[i++] != '\r');                    /* while byte received is not a carriage return */
   inmsg[i] = '\0';                               /* null terminate status message received */ if (inmsg[0] == '?')                           /* if MetraByte returns error message */
   {
      printf("\n *** ERROR : Code %s\n",inmsg);   /* printf error message */
      return (-1);                                /* return error status */
   }
   else                                           /* else valid status message received */
   {                                              /* convert status  (bytes 3 & 4) to ASCII */
      if (inmsg[3] > '9')
         tmp = inmsg[3] - '0' - 7;
      else
         tmp = inmsg[3] - '0';
      tmp <<= 4;
      if (inmsg[4] > '9')
         tmp += inmsg[4] - '0' - 7;
      else
         tmp += inmsg[4] - '0';
      return(tmp);
   };
};

/*********************************************************************
 *
 *              void setout(char * cmd)
 *                      returns DIO in lower 8 bits, or -1 on failure
 *
 *********************************************************************/ void setout(int p)                                /* turn on/off output */
{
   char *outmsg = "$MD000\r";                     /* MetraByte "set output" command */
   char *inmsg = "USE THIS SPACE AS MSG RECEIVER BUFFER";
   int i,j;
   int tmp;
   int time_out = FALSE;
   int data_not_ready = TRUE;
   int xmit_not_ready = TRUE;
   int retry = 0;
```

```
long int previous_time;
long int current_time;
long int status;
time_t timer;

atexit(ctvd_terminate);
outmsg[5] = '0' + (char) p;                              /* set address byte to desired module address */ for (i = 0; i < 7; i++)                                  /* send command */
{
   xmit_not_ready = TRUE;                                /* XMIT_NOT_READY is true */
   if(time_out) i--;                                     /* if timeout, send byte again */
   timer = time(NULL);                                   /* get time */
   previous_time = timer;                                /* store time for comparison */
   while(xmit_not_ready)                                 /* while transmit shift register not empty */
   {
      timer = time(NULL);                                /* get time */
      current_time = timer;                              /* store current time */
      if((current_time - previous_time) >= TIMEOUT_TIME) /* if difference greater than 10 seconds */
      {
         printf("\nSetout() Transmit communications timeout with MetraByte module %d.\n",p);
         com_error();                                    /* comm timeout, call com_error() */
      }
      if(bioscom(GET_STATUS, 0, COM1) & XMIT_REG_EMPTY)  /* if transmit shift register is empty */
      {
         xmit_not_ready = FALSE;                         /* XMIT_NOT_READY is false */
         status = bioscom(SEND_BYTE, outmsg[i], COM1);   /* send byte and save bioscom() return status */
         if(!(status & 0x8000))                          /* if no comm timeout */
         {
            time_out = FALSE;                            /* timeout is false */
            retry = 0;                                   /* reset retry count */
         }
         else                                            /* else timeout */
         {
            time_out = TRUE;                             /* set timeout true */
            if (retry < 3) retry++;                      /* if retry count less than 3, increment retry count */
            else                                         /* else retry count greater than 3 */
            {
               printf("\nSetout() Failure to transmit to MetraByte module %d.\n",p);
               com_error();                              /* comm timeout, call com_error() */
            }
         }
      }
   }
};

i = 0;
retry = 0;
time_out = FALSE;
do
{
   data_not_ready = TRUE;
   if(time_out == TRUE) i--;
   timer = time(NULL);
   previous_time = timer;
   while(data_not_ready)
   {
      status = bioscom(GET_STATUS, 0, COM1);
      timer = time(NULL);
      current_time = timer;
      if((current_time - previous_time) >= TIMEOUT_TIME)
      {
         printf("\nSetout() Receiver communications timeout with MetraByte module %d.\n",p);
         com_error();
      }
      if(status & DATA_READY)
      {
         data_not_ready = FALSE;
         if(!(status & 0x8000))  /* if no comm timeout */
         {
            time_out = FALSE;
            retry = 0;
            inmsg[i] = inportb(COM1_DATA);
         }
         else
         {
            time_out = TRUE;
            if (retry < 3) retry++;
            else
            {
               printf("\nSetout() Failure to receive from MetraByte module %d.\n",p);
               com_error();
            }
         }
      }
   }
}
```

```c
    }
    while (inmsg[i++] != '\r');
        inmsg[i] = '\0';

if (inmsg[0] == '?')                    /* error message from block */
    {
        printf("\n *** ERROR : Code %s\n",inmsg);
        return (-1);
    }
};

/***********************************************************************
*
*               void com_error ()
*
***********************************************************************/
com_error()
{
    ctvd_stop();
    if (close(observer_file))       /* close observer file */
    {
        error("Closed bad file number on observer_file");
        perror("Closing observer_file");
    };
    if (fclose(ref_file))           /* close reference file */
    {
        error("Closing failure on reference file");
        perror("Closing ref_file");
    };
    printf("\n\n         *** ERROR : COMMUNICATIONS TIMEOUT ***");
    printf("\n Verify communication equipment is connected properly");
    if((commerr_file = open("timeout.voc",O_RDONLY | O_BINARY)) == -1)
    {
        if (sbts_init())
        {
            sbts_settings(1,1,6,7,3);
            sbts_say("ERROR, COMMUNICATION TIME OUT.") ;
            sbts_say("PLEASE CHECK YOUR COMMUNICATION EQUIPMENT.");
        }
        else
            printf("\nSBTALKER not installed.\n") ;
    }
    else
    {
        if (ctvd_init(16))                  /* initialize Sound Blaster driver for buffered disk I/O */
        {
            error ("Sound Blaster initialization failed");
            driverError(ctvd_drv_error());
            printf("\tExtended error code is: %i.\n", ctvd_ext_error());
        }
        ctvd_speaker(1);            /* speaker on */
        if (ctvd_output(commerr_file) != NO_ERROR)   /* say file: if failure then */
        {
            error("Driver error on output");
            driverError(ctvd_drv_error());
        }
        else while (ct_voice_status);                       /* wait till done */ if (ctvd_drv_error())       /* if abnormal end */
        {
            error("Driver error at termination");
            driverError(ctvd_drv_error());
        };
        ctvd_speaker(0);
/* speaker off */
        ctvd_stop();
        ctvd_terminate();
    }
    exit(EXIT_FAILURE);
    return 0;
}

/***********************************************************************
*
*               int disksize(void)
*
***********************************************************************/
int disksize(void)
{
    struct dfree free;
    long avail;
    long total;
    float percent;
    int drive;
    float disk_limit = 10.00;
    drive = getdisk();
    getdfree(drive+1, &free);
```

```c
    if(free.df_sclus == 0xFFFF)
    {
        printf("Error in getdfree() call\n");
        exit(1);
    }
    avail = (long) free.df_avail * (long) free.df_bsec * (long) free.df_sclus;
    total = (long) free.df_total * (long) free.df_bsec * (long) free.df_sclus;
    percent = 100.00 * ((float) avail/(float) total);
    printf("\n\n\n            Drive %c: has %ld total bytes\n", 'A' + drive, total);
    printf("                  %ld bytes available\n", avail);
    printf("                  %5.2f%% of total memory available\n", percent);
    if(percent < disk_limit)
    {
        printf("\n            WARNING : Less than %5.2f%% total memory available.",disk_limit);
        printf("\n                      Advise removal of voice files from hard disk.");
        printf("\n                      This session will now be terminated.\n\n");
        exit(0);
    }
    else
    {
        printf("\n            Press any key to continue.");
        getch();
    }
    return 0;
}

/**********************************************************************
 *
 *              int setup(void)
 *
 **********************************************************************/ int setup(void)    /* initialize and test Sound Blaster and Digital I/O boards */
                   /* returns TRUE if cards are in place and functional */
{
unsigned result;   /* outcome of individual tests and initializations */
int i;             /* loop counter */ clrscr();
    printf("Dolphin Keyboard Driver and Verbal Annotation System\n\n");

if ((result = sbc_scan_card()) != 0)    /* is Sound Blaster card present? */
    {
        printf("Sound Blaster card installed at %xi.\n", ct_io_addx);
    };

if (0x0002 & ~result)                   /* is FM music chip failed? */
    {
        error("Sound Blaster FM music chip failure, non-fatal");
    };

if (0x0004 & ~result)                   /* is DSP or Voice I/O failed? */
    {
        error("Sound Blaster DSP or Voice I/O failure, fatal");
        return(FALSE);
    };

if (sbc_scan_int())                     /* attempt to determine interrupt number */
    {
        printf("Sound Blaster interrupt number is %i.\n", ct_int_num);
    }
    else
    {
        error("Sound Blaster interrupt not detected, fatal");
        return(FALSE);
    };

/*  if (ctvd_init(16))                      /* initialize Sound Blaster driver for buffered disk I/O */
/*  {
        error ("Sound Blaster initialization failed");
        driverError(ctvd_drv_error());
        printf("\tExtended error code is: %i.\n", ctvd_ext_error());
        return(FALSE);
    }
    else
    {
        printf("Sound Blaster initialization succeeded.\n");
    }; */ printf("Serial I/O devices must be located on COM1.\n");  /* test for presence of DIO blocks on COM1 */
    bioscom(SETUP_COM, SETTINGS, COM1);
    printf("Testing serial communication with I/O blocks.\n");
    i = 0;
    while (( ch != -1) && (i < NUMBLOCKS ))
    {
        ch = pollBlock(i+1);
        i++;
```

```
                        }
                        if ( ch == -1 )
                            return(FALSE);

printf("Test of Serial I/O devices completed with success.\n");
                        return(TRUE);
                    };

/***********************************************************************
*
*               int buttonpressed(unsigned)
*                       return ID number value of single new key pressed
*                       return 0 if no keys pressed
*                       return -1 if multiple or unreleased (previously reported) key pressed
*
***********************************************************************/ int buttonpressed(unsigned status)   /* status = NONE, assumes no buttons are pressed and records settings
*/
                                                /* else return the ID of a single pressed button, -1 if many, 0 if
none */
                                                /* makes multiple calls to pollBlock() */
                    {
                    static unsigned unpressed[NUMBLOCKS];
                    unsigned current[NUMBLOCKS];
                    unsigned portcount;          /* number of ports with pressed buttons */
                    int buttonID;                /* index from 1-number of buttons of single button */
                    int i;

if (status == NONE)      /* if the caller claims no buttons are pressed, then log this status */
                        {                        /* read each of the ports and store the values of buttons not pressed
*/
                            for (i = 0; i < NUMBLOCKS; i++) unpressed[i] = pollBlock(i+1);
                            gotoxy(5, yy);              /* display unpressed values */
                            printf("*** off posn: %2.2x:%2.2x:%2.2x:%2.2x:%2.2x:%2.2x:%2.2x:%2.2x:%2.2x:%2.2x:%2.2x:%2.2x:%2.2x
***\n\n\n",
unpressed[0],unpressed[1],unpressed[2],unpressed[3],unpressed[4],unpressed[5],unpressed[6],unpressed[7],
                                unpressed[8],unpressed[9],unpressed[10],unpressed[11],unpressed[12]);
                            return(0);
                        }
                        else                 /* read each of the ports and return a button ID iff only one pressed */
                        {
                            portcount = 0;
                            for (i = 0; i < NUMBLOCKS; i++)   /* test each port for key(s) pressed */
                            {
                                current[i] = pollBlock(i+1);
                                if (current[i] ^ unpressed[i]) /* at least one new key pressed */
                                {
                                    portcount++;
                                    portID = i;
                                };
                            };
                            gotoxy(5, yy + 1);  /* constant update of switch positions */
                            printf("*** switches: %2.2x:%2.2x:%2.2x:%2.2x:%2.2x:%2.2x:%2.2x:%2.2x:%2.2x:%2.2x:%2.2x:%2.2x:%2.2x
***\n\n\n",
                                current[0],current[1],current[2],current[3],current[4],current[5],current[6],current[7],
                                current[8],current[9],current[10],current[11],current[12]);

switch (portcount)   /* determine return value none, the one, or many buttons pressed */
                            {
                                case 0:
                                {
                                    gotoxy(5, yy + 2);
                                    printf("button --\n\n");
                                    return (0);               /* none pressed */
                                }
                                case 1:
                                {
                                    buttonID = portID * CHANNELSPERBLOCK + 1;
                                    switch (current[portID] ^ unpressed[portID])
                                    {
                                        case 0x0001:    buttonID += 0;
                                                                                                                    break;
                                        case 0x0002:    buttonID += 1;
                                                                                                                    break;
                                        case 0x0004:    buttonID += 2;
                                                                                                                    break;
                                        case 0x0008:    buttonID += 3;
                                                                                                                    break;
                                        case 0x0010:    buttonID += 4;
                                                                                                                    break;
                                        case 0x0020:    buttonID += 5;
                                                                                                                    break;
                                        case 0x0040:    buttonID += 6;
                                                                                                                    break;
                                        case 0x0080:    buttonID += 7;
                                                                                                                    break;
                                        default:        buttonID = -1;   /* more than one pressed */
                                                                                                                    break;
```

```c
            };
            gotoxy(5, yy + 2);
            printf("button %2d\n\n", buttonID);
            return(buttonID);              /* only one button pressed */
        };
        default:
        {
            gotoxy(5, yy + 2);
            printf("button --\n\n");
            return(-1);                    /* more than one button pressed */
        }
    };
  };
};

/**********************************************************************
*
*               void nextfile(enum action_type a, char *phrase)
*
**********************************************************************/ void nextfile(enum action_type a, char *phrase) /* create the next observer filename and add a record to
ref_file */
{
int month;
   time_t t;
   t = time(NULL);

tblock = localtime(&t);
   month = tblock->tm_mon + 1;

switch(a)
   {
      case START:
      case STOP:
      case PAUSE:
      case RESUME:
          printf("%8.8s    %02d\:%02d\:%02d
%02d\/%02d\/%02d\n",act[a],tblock->tm_hour,tblock->tm_min,tblock->tm_sec,month,tblock->tm_mday,tblock->tm_ye
ar);

fprintf(ref_file,"\"%8.8s\",\"%02d\:%02d\:%02d\",\"%02d\/%02d\/%02d\"\n",act[a],tblock->tm_hour,tblock->tm_m
in,tblock->tm_sec,month,tblock->tm_mday,tblock->tm_year);
          break;

case KEY_HIT:
          ++event_no;
          printf("%8d    %02d\:%02d\:%02d    %02d\/%02d\/%02d
%14.14s\n",event_no,tblock->tm_hour,tblock->tm_min,tblock->tm_sec,month,tblock->tm_mday,tblock->tm_year,
                phrase);

fprintf(ref_file,"\"%8d\",\"%02d\:%02d\:%02d\",\"%02d\/%02d\/%02d\",\"%14.14s\"\n",event_no,tblock->tm_hour,
tblock->tm_min,tblock->tm_sec,month,tblock->tm_mday,tblock->tm_year,
                phrase);
          break;
      case OBSERVER:
          if(!(strcmp(phrase,"FILE OPEN")))
          {
             sprintf(&observerfile[locate],"%3.3u",++observerfilecount);   /* copy count from chars 5-8 */
             strcat(observerfile,sndextension);
          }
          printf("%8d    %02d\:%02d\:%02d    %02d\/%02d\/%02d    %14.14s
%s\n",event_no,tblock->tm_hour,tblock->tm_min,tblock->tm_sec,month,tblock->tm_mday,tblock->tm_year,
                phrase,obs);

fprintf(obs_event,"\"%8d\",\"%02d\:%02d\:%02d\",\"%02d\/%02d\/%02d\",\"%14.14s\",\"%s\"\n",event_no,tblock->
tm_hour,tblock->tm_min,tblock->tm_sec,month,tblock->tm_mday,tblock->tm_year,
                phrase,obs);
          break;
   }
};

/**********************************************************************
*
*               void main(void)
*
**********************************************************************/ void main()
{
char fname[FSIZE];
char in_buf[133];
char tmp_buf[64];
char dummy;
char *announce;
char *comma_ptr;
char get_out;
int  count;
int  counter;
```

```
    int char_read;
    int i;
    int b              = 1;                                               /* button ID
pressed, none = 0, many = -1 */
    int get_id         = TRUE;
    int name           = TRUE;
    int voice          = TRUE;
    int not_cfg_file   = TRUE;
    int entry_ok       = TRUE;
    int recording      = FALSE;

clrscr();
    disksize();
    while(name)                                                           /* while prompting for valid
filename designator */
    {
        notalnum   = FALSE;                                               /* Reset not alphanumeric flag
*/
        numchar    = FALSE;                                               /* reset character count */
        toomany    = FALSE;                                               /* reset too many characters
flag */
        input_error = FALSE;                                              /* reset error flag */
        clrscr();                                                         /* clear screen and prompt for
filename desgnator */
        printf("\n\nEnter up to 5 letters as designator for the observer recording files.");
        printf("\n\nEnter designator here and press <Enter> when complete: ");
        ptr = gets(prefix);                                               /* set pointer to designator string
*/
        while(1)                                                          /* while not at end of string */
        {
            if(*ptr == '\0') break;                                       /* if at end of string, break */
            else if(!(isalnum(*ptr)))                                     /* else if not alphanumeric entry
*/
                notalnum = TRUE;                                          /* set not alphanumeric flag */
            numchar++;                                                    /* increment character count */
            if(numchar > 5) toomany = TRUE;                               /* if char count > than 5, set too
many chars flag */
            ptr++;                                                        /* increment string pointer */
        }
        if( toomany || notalnum ) input_error = TRUE;                     /* if not too many chars or
not alphanumeric */
        if(toomany)                                                       /* if too many characters, print
error message */
            printf("\n\nERROR : Designator '%s' has too many characters. Must be 5 or less.",prefix);
        if(notalnum)                                                      /* if not alphanumeric, print error
message */
            printf("\n\nERROR : '%s' is an INVALID NAME! Characters must be 0-9 or A-Z (a-z).",prefix);

if(input_error == FALSE)                                          /* if no errors */
        {
            strcpy(obs_file,DIR_SPEC);
            strcat(obs_file,prefix);
            strcat(obs_file,"*.voc");
            if(!(findfirst(obs_file,&find_file,0)))                       /* does this observer file already
exist? */
                printf("\n\nERROR: Designator '%s' already exists.",prefix); /* if YES, print error message */
            else                                                          /* if NO, print "success" message
*/
            {
                strcpy(obsevent,prefix);
                strcpy(reffile,prefix);
                strcat(obsevent,obs_suffix);
                strcat(reffile,ref_suffix);
                clrscr();
                sprintf(observerfile,"%s%s",DIR_SPEC,prefix);
                locate = strlen(observerfile);
                printf("\n\nThe observer files for this session will be %sxxx.VOC where",prefix);
                printf("\n\nxxx is a number corresponding to the previous event number.");
                printf("\n\nNOTE : Observer recording files will be written to %s",DIR_SPEC);
                printf("\n\nThe dolphin event file for this session will be %s.",reffile);
                printf("\n\nThe observer event file for this session will be %s.",obsevent);
                name = FALSE;                                             /* reset flag - valid filename has
been input */
            }
        }                                                                 /* wait for user input to continue
*/
        printf("\n\n              PRESS <Enter> to CONTINUE");
        getch();
    }
    while(voice)                                                          /* while prompting for session
voice number */
    {
        entry_ok   = TRUE;
        min_voices = MIN_VOX;                                             /* minimum number of voices */
        max_voices = MAX_VOX;                                             /* maximum number of voices */
        clrscr();                                                         /* clear screen and prompt for
voice number */
        printf("\n\nWhat voice number would you like to use for this session?");
        printf("\n            Valid voices are from 1 to %1d.",MAX_VOX);
```

```c
        printf("\n\nEnter voice number here and press <Enter> when complete: ");
        counter = 0;
        flushall();
        while((((char_read = getchar()) != EOF) && (char_read != '\n')) && (counter < 2))
        {
            vox_num[counter] = (char) char_read;
            counter++;
        }
        vox_num[counter] = '\0';
        i=0;
        while((vox_num[i] != '\0') && entry_ok)
        {
            if(!(isdigit(vox_num[i])))
            {
                printf("\n\nERROR : \"%c%c\" is not a valid entry.",vox_num[0],vox_num[1]);
                entry_ok = FALSE;
            }
            i++;
        }
        if(entry_ok)
        {
            version = vox_num;
            num_vox = atoi(vox_num);
            if((num_vox < min_voices) || (num_vox > max_voices))              /* is voice number entry valid?
*/
            {                                                                 /* if NO, print error message */
                printf("\n\nERROR : The number you specified (%d) is out of range.",num_vox);
                printf("\n            The valid range is from 1 to %1d.",MAX_VOX);
            }
            else                                                              /* else print "success" message
*/
            {
                clrscr();
                printf("\n\n     You will be using VOICE #%d for this session.",num_vox);
                voice = FALSE;                                                /* reset waiting for valid input
flag */
            }
        }
        printf("\n\n               PRESS <Enter> to CONTINUE");               /* wait for user input to continue
*/
        getch();
    } while(get_id)
    {
        clrscr();                                                            /* clear screen and prompt for
voice number */
        printf("\n\nEnter a session description (up to 80 characters) for the event file.");
        printf("\nPress <Enter> when complete\n\n");
        printf("\n1        10        20        30        40        50        60        70        80");
        printf("\n|--------|---------|---------|---------|---------|---------|---------|---------|");
        gets(session_id);                                                    /* get input string */
        if((strlen(session_id)) > 80)
        {
            printf("\n\n ERROR : Length of session description is too long!");
            printf("\n         Description must be less than 80 characters.");
            printf("\n\n               PRESS <Enter> to CONTINUE");           /* wait for user input to
continue */
            getch();
        }
        else
        {
            printf("\n\n               PRESS <Enter> to CONTINUE");           /* wait for user input to
continue */
            getch();
            get_id = FALSE;
        }
    }
    if ((ref_file = fopen(reffile, "wt")) == NULL) /* open reference file to record date, time, filenames,
presses */
    {                                              /* wrt only, text mode */
        error("Cannot create reference file.  Disk may be full");
        perror(reffile);
        exit(EXIT_FAILURE);
    };
    /* write reference file header */
    fprintf(ref_file,"\"%s\"\n",session_id);
    fprintf(ref_file,"\"Voice #%d is used for this session.\"\n",num_vox);
    fprintf(ref_file,"\"Observer recording files are in %s\"\n",DIR_SPEC);

if ((obs_event = fopen(obsevent, "wt")) == NULL) /* open reference file to record date, time, filenames,
presses */
    {                                                /* wrt only, text mode */
        error("Cannot create reference file.  Disk may be full");
        perror(reffile);
        exit(EXIT_FAILURE);
    };
```

```c
/* write reference file header */
fprintf(obs_event,"\"%s\"\n",session_id);
fprintf(obs_event,"\"Voice #%d is used for this session.\"\n",num_vox);
fprintf(obs_event,"\"Observer recording files are in %s\"\n",DIR_SPEC);

while(not_cfg_file)
{
    while(1)
    {
        clrscr();                                                    /* clear screen and prompt for
filename desgnator.*/
        printf("\n\nEnter name of configuration file to be used in this session.");
        printf("\n\nPress <Enter> when complete: ");
        gets(fname);
        if(!(findfirst(fname,&find_file,0)))                         /* set pointer to designator string */
                                                                     /* does this observer file already
exist? */
        {
            printf("\n\nConfiguration file '%s' will be used for this session.",fname);
            printf("\n\n              PRESS <Enter> to CONTINUE");
            getch();
            break;
        }
        else
        {
            printf("\n\n ERROR : Configuration file '%s' does not exist.",fname);
            printf("\n        Verify that configuration file resides in C:\\DOLPHIN");
            exit(-1);
        }
    }
    if((cfg_in = fopen(fname,"r")) == NULL)
    {
        printf("\n\nERROR : Problem opening %s",fname);
    }
    else
    {
        not_cfg_file = FALSE;
        while(1)
        {
            if(fscanf(cfg_in,"%s",in_buf) == EOF) break;
            sscanf(in_buf,"%[^,]",cfg_file_ptr->word);
            comma_ptr = strchr(in_buf,',');
            if(comma_ptr == NULL)
            {
                printf("\n\nERROR : Invalid configuration file format.  Fields are not comma delimited.");
                printf("\n LINE : %s",in_buf);
                exit(-1);
            }
            strcpy(cfg_file_ptr->vox_file,comma_ptr+1);
            cfg_file_ptr++;
        }
        fclose(cfg_in);
    }
}
for(count=0;count<127;count++)                          /* Build path and voice file name */
{
    strcpy(tmp_buf,cfg_file[count].vox_file);           /* copy voice file prefix to temp buffer */
    strcpy(cfg_file[count].vox_file,"C:\\WORDS\\");     /* write voice file path to structure */
    strncat(cfg_file[count].vox_file,tmp_buf,50);       /* concatenate prefix to path */
    strcat(cfg_file[count].vox_file,"_");               /* concatenate "_" to name */
    strcat(cfg_file[count].vox_file,version);           /* concatenate voice version to name */
    strcat(cfg_file[count].vox_file,sndextension);      /* concatenate ".VOC" to name */
}
clrscr();
if (setup() == TRUE)         /* special hardware checks out and is initialized */
{
    atexit(ctvd_terminate);   /* kill the driver on exit */
    printf("\n");
    yy = wherey();            /* note position on screen for data updates */
    ctvd_speaker(0);          /* since we don't care to have the observer announced */
                              /* speaker off */
    buttonpressed(NONE);      /* note the normal positions of the keys */
    observerfilecount = 0;    /* start from base of the observer filenames */
    nextfile(START, "");      /* make opening entry into file */

/***********************************************************
/
/  speak for dolphin keys, record observer, and log activity
/
***********************************************************/
    while (key == RUN)    /* exit loop when return is pressed */
    {
        while (buttonpressed(ANY));   /* wait for keyboard to clear (but haven't held up recording) */
                                       /* record observer until dolphin or keyboard or recording stops */
        while ( ((b = buttonpressed(ANY)) <= 0) && (!kbhit()));   /* wait until something happens */
        if (b > 0)              /* test for dolphin hit */
        {                        /* new dolphin key pressed */
            if(portID != 12)
            {
```

```c
        if(recording == TRUE)
        {
           recording = FALSE;
           ctvd_stop();
           ctvd_terminate();
           if (close(observer_file))      /* close observer now, when speed is not of essence */
           {
              error("Closed bad file number on observer_file");
              perror("Closing observer_file");
           };
           nextfile(OBSERVER,"FILE CLOSED");
           setout(0);
        }
        dest = (char *) filename;    /* build filename for sound chosen */
        source = (char *) &cfg_file[b-1].vox_file; /* mja */
        while (*source != '\0')   *(dest++) = *(source++);
        *(dest) = '\0';
        if ((voice_file = open(filename, O_RDONLY | O_BINARY)) == -1) /* announce dolphin key strike
*/
        {                               /* open voice file failed */
           error("Cannot open dolphin key sound file");
           perror(filename);
        }
        else                            /* file open, it's ready to talk */
        {
           if (ctvd_init(16))                /* initialize Sound Blaster driver for buffered
disk I/O */
           {
              error ("Sound Blaster initialization failed");
              driverError(ctvd_drv_error());
              printf("\tExtended error code is: %i.\n", ctvd_ext_error());
              break;
           }
           ctvd_speaker(1);                  /* speaker on */
           if (ctvd_output(voice_file) != NO_ERROR)   /* say file: if failure then */
           {
              error("Driver error on output");
              error((char *) &cfg_file[b-1].vox_file);
              driverError(ctvd_drv_error());
           }
           else while (ct_voice_status);                       /* wait till done */ if (ctvd_drv_error())        /* if abnormal end */
           {
              error("Driver error at termination");
              error((char *) &cfg_file[b-1].vox_file);
              driverError(ctvd_drv_error());
           };

ctvd_speaker(0);
        /* speaker off */
           ctvd_stop();
           ctvd_terminate();
           if (close(voice_file))  /* complete file related housekeeping */
           {
              error("Closed bad file number on voice_file");
              perror("Closing voice_file");
           };
        };
                                    /* open and start recording the next observer file */
        announce = (char *) &cfg_file[b-1].word; /* mja */
        nextfile(KEY_HIT, announce);
     }
     else
     {
        if(recording == FALSE)
        {
           nextfile(OBSERVER,"FILE OPEN");
           recording = TRUE;
           if (ctvd_init(16))                /* initialize Sound Blaster driver for buffered
disk I/O */
           {
              error ("Sound Blaster initialization failed");
              driverError(ctvd_drv_error());
              printf("\tExtended error code is: %i.\n", ctvd_ext_error());
              break;
           }
           else if ((observer_file = open(observerfile, O_WRONLY | O_BINARY | O_CREAT,S_IREAD |
S_IWRITE)) == -1)
           {
              error("Cannot create observer audio file. Disk may be full");
              perror(observerfile);
              break;
           };
           setout(1);
           ctvd_speaker(0);
           if (ctvd_input(observer_file,SAMPLERATE))
           {
```

```
                    driverError(ctvd_drv_error());
                };
            }
            else
            {
                recording = FALSE;
                ctvd_stop();
                ctvd_terminate();
                if (close(observer_file))      /* close observer now, when speed is not of essence */
                {
                    error("Closed bad file number on observer_file");
                    perror("Closing observer_file");
                    break;
                };
                nextfile(OBSERVER,"FILE CLOSED");
                setout(0);
            }
        };
    }
    else                        /* not due to dolphin key press */
                                /* these options will not (here) stop the observer recording */
    {                           /* test for computer keyboard hit */
        if (kbhit())
        {                            /* if kbhit */
            gets(keypress);
            if ( keypress[0] == 'p' || keypress[0] == 'P' )
            {                        /* if pause */
                clrscr();
                ctvd_pause();
                nextfile(PAUSE,"");
                printf("Press the letter r to resume the session\n");
                while ( keypress[0] != 'r' && keypress[0] != 'R' )
                {                    /* while resume */
                    gets(keypress);
                }                    /* while resume */
                ctvd_continue();
                clrscr();
                nextfile(RESUME,"");
            }                        /* end if pause */
            if ( keypress[0] == 'x' || keypress[0] == 'X')
                key = QUIT;
        }                            /* end if kbhit */
    };
};

/* return key or memory full has brought us here */
ctvd_stop();                /* stop recording */
ctvd_terminate();           /* kill the driver */ if(recording == TRUE)
{
    recording = FALSE;
    if (close(observer_file))      /* close observer file (if open, should be) */
    {
        error("Closed bad file number on observer_file");
        perror("Closed observer_file");
    };
    nextfile(OBSERVER,"FILE CLOSED");
}
nextfile(STOP, "");
setout(0);                  /* write final record to reference file */
};
if (fclose(ref_file))       /* close reference file (if open, should be) */
{
    error("Closing failure on reference file");
    perror("Closing ref_file");
};

printf("\n\nSession ended.\n");
};
```

```c
// SERIAL.C
// serial data communications
//  wgr   6/10/91 include <bios.h>
include <stdio.h> define SET_MODE 0
define SEND_CHAR 1
#define GET_CHAR 2
define GET_STATUS 3 define COM1 0
define COM2 1 define DATA_7 0x02
define          DATA_8 0x03 define STOP_1 0x00
define STOP_2 0x40 define NO_PARITY 0x00
define          ODD_PARITY 0x08
define EVEN_PARITY 0x18 define BAUD_110 0x00
define BAUD_150 0x20
#define BAUD_300 0x40
#define BAUD_600 0x60
#define BAUD_1200 0x80
#define BAUD_2400 0xA0
#define BAUD_4800 0xC0
define BAUD_9600 0xE0 define SERIAL_ERROR 0x8000

/* upper byte reflects status after all commands */
/* upper byte is all zero following a successful read */
#define TIME_OUT 0x8000
#define XMIT_SHIFT_REG_EMPTY 0x4000
#define XMIT_HOLDING_REG_EMPTY 0x2000
#define BREAK_DETECT 0x1000
#define FRAMING_ERROR 0x0800
#define PARITY_ERROR 0x0400
#define OVERRUN_ERROR 0x0200
#define DATA_READY 0x0100
#define NO_ERROR 0x0000
#define HIGH_BYTE 0xFF00

/* setting of lower byte after SET_MODE and GET_STATUS commands */
/* also true following SEND_CHAR, unless TIME_OUT error shown */
#define RECEIVED_LINE_SIGNAL_DETECT 0x0080
#define RING_INDICATOR 0x0040
#define DATA_SET_READY 0x0020
#define CLEAR_TO_SEND 0x0010
#define CHANGE_IN_RECEIVE_LINE_SIGNAL_DETECTOR 0x0008
#define TRAILING_EDGE_RING_DETECTOR 0x0004
#define CHANGE_IN_DATA_SET_READY 0x0002
#define CHANGE_IN_CLEAR_TO_SEND 0x0001
define LOW_BYTE 0x00FF unsigned status;       /* result of serial I/O activity */
```

```c
void serialError(char *msg)
    {
    printf("**** Serial Error: %s. ***\n", msg);
    };

void serialFlag(char *msg)
    {
    printf("    Serial Flag: %s. \n", msg);
    };

void serialErrorTest(void)
    {
    unsigned err;

err = bioscom(GET_STATUS, 0, COM1);
    if (err & TIME_OUT) serialError("Time out expired");
    if (err & XMIT_SHIFT_REG_EMPTY)
        serialError("Transmit shift register empty");
    if (err & XMIT_HOLDING_REG_EMPTY)
        serialError("Transmit holding register empty");
    if (err & BREAK_DETECT) serialError("Break signal detected");
    if (err & FRAMING_ERROR) serialError("Framing");
    if (err & PARITY_ERROR) serialError("Parity");
    if (err & OVERRUN_ERROR) serialError("Data overrun");
    if (err & DATA_READY) serialError("Data ready");
    if (err == NO_ERROR) /* nothing */;

if (err & RECEIVED_LINE_SIGNAL_DETECT)
        serialFlag("Received line signal detect");
    if (err & RING_INDICATOR) serialFlag("Ring detected");
    if (err & DATA_SET_READY) serialFlag("Data set ready (DSR)");
    if (err & CLEAR_TO_SEND) serialFlag("Clear to send (CTS)");
    if (err & CHANGE_IN_RECEIVE_LINE_SIGNAL_DETECTOR)
        serialFlag("Change in receive line signal detector");
    if (err & TRAILING_EDGE_RING_DETECTOR)
        serialFlag("Trailing edge ring detector");
    if (err & CHANGE_IN_DATA_SET_READY)
        serialFlag("Change in data set ready (DSR)");
    if (err & CHANGE_IN_CLEAR_TO_SEND)
        serialFlag("Change in clear to send (CTS)");
    };

int openCOM_1()
    /* configure for operation, returning 0 if no errors */
    {
    status = bioscom(SET_MODE, BAUD_9600 | STOP_1 | DATA_8 | NO_PARITY, COM1);
    serialErrorTest(); /* report the results */
    if (status & SERIAL_ERROR)
        {
        return(1);
        }
    else
        {
        return(0);
        };
    };

int sendCOM_1(char *msg)
    /* output a string to serial line. Return 0 on success, 1 on failure */
    {
    int i = 0;
```

```c
                /* send each character in string */
                while (msg[i] != '\0')
                        {
                        status = bioscom(SEND_CHAR, msg[i++], COM1);  /* send each character */
                        if (status & TIME_OUT)
                                {
                                serialErrorTest();
                                return(1);
                                }
                        /* wait if a character is already pending transmission */
                        while(!(status & XMIT_HOLDING_REG_EMPTY))
                                bioscom(GET_STATUS, 0, COM1);    /* hold off next char */
                        };
                /* wait until last character is transmitted */
                while (!(status & XMIT_SHIFT_REG_EMPTY))
                        bioscom(GET_STATUS, 0, COM1);            /* wait until sent */ return(0);
                };

int     getCOM_1(char *dest, unsigned max)
        /* receive from serial and dump into dest until <return> */
        {
        unsigned i = 0;

do
                /* get characters until failure or return character */
                {
                status = bioscom(GET_CHAR, dest[i], COM1);
                if (status & SERIAL_ERROR)
                        {
                        serialErrorTest();
                        return(1);
                        };
                dest[i] = (char) (status & LOW_BYTE);
                }
        while ((dest[i++] != '\x0d') && (i < max));
        return(0);
        };
// SERIAL.H
// serial data communications function prototypes
//   wgr  6/10/91 int     openCOM_1(void);              /* open and configure port */
int     sendCOM_1(char *);            /* transmit text string */
int     getCOM_1(char *, unsigned);   /* receive return terminated string */
/* Sound Blaster file SBC.H */ ifndef  ct_io_addx
     extern  unsigned    near    ct_io_addx ;
     extern  unsigned    near    ct_int_num ;
endif unsigned        ct_card_here(void);
unsigned        ct_scan_card(void);
unsigned        sbc_scan_card(void);
unsigned        sbc_scan_int(void);
unsigned        sbc_check_card(void);
unsigned        sbc_version(void);
unsigned        sbc_dsp_reset(void);
```

```
/* Sound Blaster file SBCVOICE.H */ ifndef  ct_io_addx
    extern unsigned    near ct_io_addx ;
    extern unsigned    near ct_int_num ;
endif ifndef NO_ERROR
    #define NO_ERROR        0
endif extern unsigned    near ct_voice_status ;

/*   creative voice file disk version driver    */ int   ctvd_init(int) ;
void  ctvd_terminate(void) ;
void  ctvd_speaker(int) ;
int   ctvd_output(int) ;
int   ctvd_input(int,int) ;
void  ctvd_stop(void) ;
void  ctvd_pause(void) ;
void  ctvd_continue(void) ;
void  ctvd_break_loop(int) ;
int   ctvd_drv_error(void) ;
int   ctvd_ext_error(void) ;

/*   creative voice file memory version driver    */ int   ctvm_initial(void) ;
void  ctvm_terminate(void) ;
void  ctvm_speaker(int) ;
int   ctvm_input(char far*,unsigned long,int) ;
int   ctvm_output(char far*) ;
void  ctvm_pause(void) ;
void  ctvm_continue(void) ;
void  ctvm_stop(void) ;
void  ctvm_break_loop(int) ;

/*   creative voice file header    */ typedef  struct
    {
        char        id[20] ;
        unsigned    voice_offset ;
        unsigned    version ;
        unsigned    check_code ;
    } VOCHDR ;
```

What is claimed is:

1. A communication device for communication between marine mammals and humans comprising:
   a submersible keyboard, said keyboard having at least one panel in which a plurality of hollow keys are disposed, said at least one panel having a front surface and a plurality of openings, each key having
   a housing open at a first end and mounted at said first end to an opening in said panel,
   an object situated in said key housing near said panel opening, said object comprising an echolocatable object providing a unique echoic or visual representation of an audible language element, and,
   a switch means which can be activated by a marine mammal to produce a signal when a key is selected; and,
   an audio generator coupled to each key for detecting said signal and generating said audible language element when said switch is activated.

2. The communication device as set forth in claim 1, wherein said switch comprises a photosensor circuit in which at least one optical beam is transmitted across the opening of the key housing adjacent to said front surface, said switch activatable by interrupting the beam radiated across the opening of the key.

3. The communication device as set forth in claim 2 additionally comprising a means for visual feedback, wherein each key is illuminated by an illumination means coupled to said switch when said switch is activated.

4. The communication device as set forth in claim 3, wherein said photosensor is housed together with an optical beam generator and said illumination means in a fluid-impervious housing, said illumination means coupled to at least one fiber optic cable for carrying a visible light beam from the illumination means to the opening of said key, said fluid-impervious housing additionally comprising an optically clear coupling element forming a part of said housing, said coupling element having an interior surface facing into said housing, and an exterior surface facing outwardly from said housing, and a blind hole extending into said exterior surface less than all the way through said coupling element, said blind hole sized to snugly hold said fiber optic cable, whereby the visible light beam from the illumination means can pass through said optically clear coupling element into said fiber optic cable for transmission to the key opening, and each fiber-optic cable can be removed and replaced without the intrusion of water into said watertight housing.

5. The communication device as set forth in claim 4 wherein said fluid impervious housing also includes a first through hole for connecting a first fiber optic cable to the optical generator and a second through hole for connecting a second fiber optic cable to the photosensor, whereby said first fiber optic cable carries a light beam from the optical generator to the opening of the key so as to cast an optical beam across the opening of the key, and said second fiber optic cable is spaced apart from and aligned with said first fiber optic cable to receive the optical beam on the opposite side of the key and carry it to the photosensor switch, so that when said beam is interrupted, the photosensor will detect the interruption and generate a signal, said first and second fiber optic cables each having a water proof coupling for sealing the through holes in said housing to prevent the ingress of water into the fluid impervious housing.

6. The communication device as set forth in claim 1, wherein the audible language element comprises a spoken word.

7. The communication device as set forth in claim 1, additionally comprising a control means which detects said signal generated when a key is selected by activation of said switch, and controls the audio generator to generate the audible language element associated with that key.

8. The communication device as set forth in claim 7, whereby said control means controls the audio generator by determining which key has been selected and then transmitting a code identifying the associated audible language element to be generated.

9. The communication device as set forth in claim 8, said control means further comprising a storage means for storing the codes identifying the audible language element to be output for each key.

10. The communication device as set forth in claim 8, wherein said audible language elements comprise spoken words, said control means storing multiple versions of the spoken word associated with each key, said versions differentiated by the voice of the spoken word, said control means selecting a version to be generated when a key is selected.

11. The communication device as set forth in claim 7, wherein said control means further comprises a recording means for recording a log of events, including the keys selected and the time at which the keys were selected.

12. The communication device as set forth in claim 11, said control means further comprising an operator interface for recording observations made by an observer corresponding to said events, wherein the log of events further indicates the corresponding observations recorded.

13. The communication device as set forth in claim 12, wherein the observations recorded by the observer are verbal observations, and said control means receives the verbal observations and translates them into digital information to be stored in the control means.

14. The communication device as set forth in claim 13 wherein said control means includes a replay function for creating and displaying a log of events recorded, for selecting an event from the log to review, and for interfacing with the audio means for replaying any verbal observations recorded by the observer which correspond to the event being reviewed.

15. A communication device for communication with marine mammals comprising:
   a submersible keyboard having at least one panel in which is disposed a plurality of hollow keys, each key including a non-contactable switch capable of generating a signal when activated, and a unique echolocatable object situated inside the hollow key;
   a means for detecting said signal and providing audible feedback to said marine mammal when a key is selected by activating said switch, said feedback representative of a language element associated with the object in said key, whereby said marine mammal will be enabled to learn to communicate language elements by identifying and selecting keys associated with desired language elements and activating the switch in those keys.

16. The communication device as set forth in claim 15, wherein said non-contactable switch comprises a photodetector in combination with an optical generator which generates at least one optical beam which is radiated across the opening of the key, said switch activatable by interrupting the beam radiated across the opening of the key.

17. The communication device as set forth in claim 16, wherein said optical beam is an infrared beam.

18. The communication device as set forth in claim 16, additionally comprising a means for providing visual feedback to said marine mammal when a key is selected and said switch is activated.

19. The communication device as set forth in claim 18 wherein said means for providing visual feedback is a visible light generator which illuminates the key when a signal is detected indicating that the switch has been activated.

20. The communication device as set forth in claim 16, wherein said photosensor and optical beam generator are housed together with said visible light generator in a fluid-impervious housing, said visible light generator coupled to at least one fiber optic cable for carrying a visible light beam from the visible light generator to the opening of said key, said fluid-impervious housing additionally comprising an optically clear coupling element forming a part of said housing, said coupling element having an interior surface facing into said housing, and an exterior surface facing outwardly from said housing, and a blind hole extending into said exterior surface less than all the way through said coupling element, said blind hole sized to snugly hold said fiber optic cable, whereby the visible light beam from the visible light generator can pass through said optically clear coupling element into said fiber optic cable for transmission to the key opening, and each fiber-optic cable can be removed and replaced without the intrusion of water into said watertight housing.

21. The communication device as set forth in claim 20 wherein said fluid impervious housing includes a first through hole for connecting a first fiber optic cable to the optical beam generator and a second through hole for connecting a second fiber optic cable to the photosensor, whereby said first fiber optic cable carries a light beam from the optical beam generator to the opening of the key so as to cast an optical beam across the opening of the key, and said second fiber optic cable is spaced apart from and aligned with said first fiber optic cable to receive the optical beam on the opposite side of the key and carry it to the photosensor switch, so that when said beam is interrupted, the photosensor will detect the interruption and generate a signal, said first and second fiber optic cables each having a water proof coupling for sealing the through holes in said housing to prevent the ingress of water into the fluid impervious housing.

22. The communication device as set forth in claim 15, additionally comprising a recording means to record a log of events, each event indicating the key selected and the time at which the key was selected.

23. A method for training marine mammals to communicate using a communication device having a submersible keyboard with at least one panel in which one or more hollow keys are disposed, each said hollow key having an object disposed therein which is distinguishable by the marine mammal from other objects and a switch which can be activated by said marine mammal, the communication device further comprising a computer for receiving a signal generated by the switch when said switch is activated by said marine mammal and providing feedback in the form of an audible language element associated with the selected key, said method comprising the steps of:
submerging said keyboard in an aquatic environment containing one or more marine mammals;
permitting the marine mammals to echolocate or visually distinguish the object in each key to locate a desired key and to select that key by activating said switch to generate the spoken word or phrase associated with the selected key; and
reinforcement of correct selection by human recognition of and an appropriate response to the keys selected by the marine mammal.

24. The method for training as set forth in claim 23, wherein each key switch further comprises a photosensor that is activated, and generates said signal, when a light beam radiated across the opening of the key is interrupted, said step of selecting a key further comprising interrupting the beam radiated across the key opening.

25. The method of claim 24 additionally comprising the step of using the computer to record and transmit the order of key selections to a human observer whereby an appropriate response can be formulated and transmitted to a marine mammal engaged in communicating.

26. The method of training as set forth in claim 23 in which the keyboard also provides a means for illuminating a selected key, whereby the key will be illuminated when a marine mammal selects a key and activates said switch.

27. The method for training as set forth in claim 23, further comprising the step of using a program in the computer to record the observations made, including keys selected, during a session.

28. A method for communication by marine mammals using a communication device having a submersible keyboard with at least one panel in which a plurality of hollow keys are disposed, each said hollow key having an object disposed therein which is distinguishable by the marine mammal from other objects in other keys, each said key associated with a specific audible language element which has been learned by the marine mammal, and a switch which can be activated by said marine mammal when a key is selected, the communication device further comprising a computer for receiving and processing a signal generated by said switch, said method comprising the steps of:
submerging said keyboard in an aquatic environment containing one or more marine mammals;
permitting the marine mammals to select the keys which are associated with the language elements which the marine mammals wish to use, said keys being selected by activating said switch; and
observing the key selections and responding to the key selections made by the marine mammal when an understandable message is communicated.

29. The method of claim 28 wherein the response to the key selections is an audible response which can be heard by the marine mammal.

30. A communication device for communication with marine mammals comprising:
a panel;
a key disposed in said panel and having
an open end,
an object disposed therein which is distinguishable by the marine mammal, and
an optical switch which can be activated by said marine mammal, said switch including an optical beam generator means positioned at said open end for radiating an optical beam across said open end, and a photosensor, aligned with and positioned opposite said optical beam generator means for detecting the radiated optical beam, whereby said switch generates a signal when an object passes between said optical beam generator and said photosensor, thereby indicating the key has been selected; and,
a controller for receiving and processing said signal.

31. The communication device as set forth in claim 30, wherein said optical beam is an infrared beam.

32. The communication device as set forth in claim 30, wherein said optical beam and photosensor are mounted between said open end and said object.

33. The communication device as set forth in claim 30, wherein said object is visually distinguishable by said marine mammal.

34. The communication device as set forth in claim 30, wherein said object is distinguishable by said marine mammal by means of echolocation.

35. The communication device as set forth in claim 30, additionally comprising an illumination device for illuminating said open end of said key.

36. The communication device as set forth in claim 35, wherein said illumination device illuminates said key at a second intensity when said signal is generated.

37. The communication device as set forth in claim 35, wherein said illumination device illuminates said open end of said key when said signal is generated.

38. The communication device as set forth in claim 37 wherein said illumination device is operated by said controller.

39. The communication device as set forth in claim 35 wherein said photosensor is housed together with said optical beam generator means and said illumination device in a fluid-impervious housing, said illumination device coupled to at least one fiber optic cable for carrying a visible light beam from the illumination device to the opening of said key, said fluid-impervious housing additionally comprising an optically clear coupling forming a part of said housing, said coupling element having an interior surface facing into said housing, and an exterior surface facing outwardly from said housing, and a blind hole extending into said exterior surface less than all the way through said coupling element, said blind hole sized to snugly hold said fiber optic cable, whereby the visible light beam from the illumination device can pass through said optically clear coupling element into said fiber optic cable for transmission to the key opening, and each fiber-optic cable can be removed and replaced without the intrusion of water into said watertight housing.

40. The communication device as set forth in claim 39 wherein said fluid impervious housing includes a first through hole for connecting a first fiber optic cable to the optical generator and a second through hole for connecting a second fiber optic cable to the photosensor, whereby said first fiber optic cable carries a light beam from the optical generator to the opening of the key so as to cast an optical beam across the opening of the key, and said second fiber optic cable is spaced apart from and aligned with said first fiber optic cable to receive the optical beam on the opposite side of the key and carry it to the photosensor switch, so that when said beam is interrupted, the photosensor will detect the interruption and generate a signal, said first and second fiber optic cables each having a water proof coupling for sealing the through holes in said housing to prevent the ingress of water into the fluid impervious housing.

41. The communication device as set forth in claim 30, additionally comprising an audio generator for generating audible sound when said signal is generated.

42. The communication device as set forth in claim 41 wherein said sound is an identifiable human word or phrase.

43. The communication device as set forth in claim 42 additionally comprising a recording means operatively linked to said controller for recording signals from said key.

44. The communication device as set forth in claim 43, wherein a plurality of keys are disposed in said panel, and wherein said recording means produces a log of events, each event indicating the key selected and the time at which the key was selected.

45. The communication device as set forth in claim 44, wherein the log of events further identifies the audible sound produced in response to each signal generated by each key.

46. The communication device as set forth in claim 44 wherein said plurality of keys are arranged in an irregular configuration in said panel to provide local spatial cues.

47. The communication device as set forth in claim 44 additionally comprising an operator interface means operatively linked to said controller for recording on said recording means observations made by an observer.

48. The communication device as set forth in claim 47, further comprising a replay means having a log display means for displaying the log of events recorded and an event selection means for selecting for review an event from the log; said replay means operatively linked to said audio generator for replaying any verbal observations recorded through said operator interface and corresponding to the selected event.

49. The communication device as set forth in claim 48, wherein said communication device comprises a plurality of panels mounted on a frame which locates the panels at predetermined angles to one another.

50. The communication device as set forth in claim 49 additionally including landmarks to enable a marine mammal to distinguish any one of said panels from the remaining panels.

51. The communication device as set forth in claim 41, wherein the controller controls said audio generator, whereby when said signal is generated, the controller will output a corresponding digital signal to said audio generator to produce a preselected audible sound.

52. The communication device of claim 30 wherein said key further comprises a hollow, cylindrical housing.

53. The communication device as set forth in claim 30, wherein said device is mobile.

54. The communication device as set forth in claim 53, additionally comprising a remotely operated vehicle to which said panel is attached.

* * * * *